US011916294B2

(12) United States Patent
Yoshikawa

(10) Patent No.: US 11,916,294 B2
(45) Date of Patent: Feb. 27, 2024

(54) ANTENNA, WIRELESS COMMUNICATION MODULE, AND WIRELESS COMMUNICATION DEVICE

(71) Applicant: KYOCERA CORPORATION, Kyoto (JP)

(72) Inventor: Hiromichi Yoshikawa, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 400 days.

(21) Appl. No.: 17/286,820

(22) PCT Filed: Oct. 25, 2019

(86) PCT No.: PCT/JP2019/042059
§ 371 (c)(1),
(2) Date: Apr. 20, 2021

(87) PCT Pub. No.: WO2020/090692
PCT Pub. Date: May 7, 2020

(65) Prior Publication Data

US 2021/0359418 A1 Nov. 18, 2021

(30) Foreign Application Priority Data

Oct. 31, 2018 (JP) ................................ 2018-206004

(51) Int. Cl.
*H01Q 13/18* (2006.01)
*H01Q 1/52* (2006.01)
*H01Q 21/06* (2006.01)

(52) U.S. Cl.
CPC ............... *H01Q 13/18* (2013.01); *H01Q 1/52* (2013.01); *H01Q 21/06* (2013.01)

(58) Field of Classification Search
CPC .......... H01Q 1/243; H01Q 1/521; H01Q 5/35; H01Q 21/065; H01Q 5/371; H01Q 5/378;
(Continued)

(56) References Cited

U.S. PATENT DOCUMENTS 4,827,271 A 5/1989 Berneking et al.
10,033,088 B2 7/2018 Zhang et al.
(Continued)

FOREIGN PATENT DOCUMENTS

CN 105210232 A 12/2015
EP 2940795 A1 11/2015
JP 2017504274 A 2/2017

*Primary Examiner* — Linh V Nguyen
(74) *Attorney, Agent, or Firm* — HAUPTMAN HAM, LLP

(57) ABSTRACT

In an antenna, a first antenna element includes a first radiation conductor and a first feeder line. A second antenna element includes a second radiation conductor and a second feeder line. A second feeder line is coupled to the first feeder line such that a first component, which is a capacitance component or an inductance component, is dominant. A first coupler couples the first and second feeder lines such that a second component different from the first component is dominant. The first and second radiation conductors are arranged at interval of ½ or less of resonance wavelength. The second feeder line is coupled to the first radiation conductor such that a third component, which is the capacitance component or the inductance component, is dominant. The first coupling portion couples the first radiation conductor and the second feeder line such that a fourth component different from the third component is dominant.

20 Claims, 14 Drawing Sheets

(58) Field of Classification Search

CPC .... H01Q 21/24; H01Q 9/0457; H01Q 1/2283; H01Q 1/523; H01Q 5/328; H01Q 5/335; H01Q 9/045; H01Q 1/52; H01Q 21/29; H01Q 5/392; H01Q 9/0435; H01Q 9/285; H01Q 9/04; H01Q 9/065; H01Q 9/30; H01Q 25/001; H01Q 25/005; H01Q 13/08

USPC .......................... 341/702, 700 MS, 846, 893

See application file for complete search history.

(56) References Cited

U.S. PATENT DOCUMENTS 10,892,547 B2 * 1/2021 Rakib .................. H01Q 21/065
2006/0038736 A1 * 2/2006 Hui ........................ H01Q 1/243 343/834
2006/0044196 A1 3/2006 Grant et al.
2006/0049990 A1 * 3/2006 Watada .................... H01Q 1/38 343/702
2008/0158081 A1 * 7/2008 Rofougaran ........... H01Q 23/00 343/861
2010/0159857 A1 6/2010 Kling et al.
2012/0013519 A1 * 1/2012 Hakansson .............. H01Q 1/38 343/835
2012/0306718 A1 * 12/2012 Koyanagi ................ H01Q 9/42 343/853
2013/0002510 A1 * 1/2013 Azulay .................. H01Q 1/243 343/893
2013/0057438 A1 3/2013 Satou et al.
2013/0088400 A1 * 4/2013 Chen ...................... H01Q 1/521 343/770
2013/0102357 A1 * 4/2013 Vance ................. H04M 1/0202 343/857
2015/0255849 A1 9/2015 Sumiyosi et al.
2016/0294062 A1 10/2016 Lo Hine Tong et al.
2017/0012345 A1 1/2017 Zhang et al.
2017/0084990 A1 * 3/2017 Le Thuc ................ H01Q 21/28
2017/0244149 A1 8/2017 Kim et al.
2019/0312347 A1 * 10/2019 Edwards .............. H01Q 9/0435
2021/0359418 A1 11/2021 Yoshikawa
2021/0399435 A1 12/2021 Yoshikawa

* cited by examiner

ANTENNA, WIRELESS COMMUNICATION MODULE, AND WIRELESS COMMUNICATION DEVICE

CROSS-REFERENCE TO RELATED APPLICATIONS

This application is a National Stage of PCT international application Ser. No. PCT/JP2019/042059 filed on Oct. 25, 2019 which designates the United States, incorporated herein by reference, and which is based upon and claims the benefit of priority from Japanese Patent Application No. 2018-206004 filed on Oct. 31, 2018, the entire contents of which are incorporated herein by reference.

FIELD

The present disclosure relates to an antenna, a wireless communication module, and a wireless communication device.

BACKGROUND

In an array antenna, an antenna for multiple-input multiple-output (MIMO), and the like; a plurality of antenna elements are arranged close to each other. When the plurality of antenna elements are arranged close to each other, mutual coupling between the antenna elements can be increased. When the mutual coupling between the antenna elements is increased, radiation efficiency of the antenna elements may decrease.

Therefore, a technique for reducing the mutual coupling between the antenna elements has been proposed (for example, Patent Literature 1).

CITATION LIST

Patent Literature

Patent Literature 1: JP 2017-504274 A

SUMMARY

An antenna according to an embodiment of the present disclosure includes a first antenna element, a second antenna element, a first coupler, and a first coupling portion. The first antenna element includes a first radiation conductor and a first feeder line and is configured to resonate in a first frequency band. The second antenna element includes a second radiation conductor and a second feeder line and is configured to resonate in a second frequency band. The second feeder line is configured to be coupled to the first feeder line such that a first component is dominant. The first component is one of a capacitance component and an inductance component. The first coupler is configured to couple the first feeder line and the second feeder line such that a second component different from the first component is dominant. The first radiation conductor and the second radiation conductor are arranged at an interval equal to or less than ½ of a resonance wavelength. The second feeder line is configured to be coupled to the first radiation conductor such that a third component is dominant. The third component is one of the capacitance component and the inductance component. The first coupling portion is configured to couple the first radiation conductor and the second feeder line such that a fourth component different from the third component is dominant.

A wireless communication module according to an embodiment of the present disclosure includes the above-described antenna and an RF module. The RF module is configured to be electrically connected to at least one of the first feeder line and the second feeder line.

A wireless communication device according to an embodiment of the present disclosure includes the above-described wireless communication module and a battery. The battery is configured to supply power to the wireless communication module.

DESCRIPTION OF EMBODIMENTS

Figure 1:
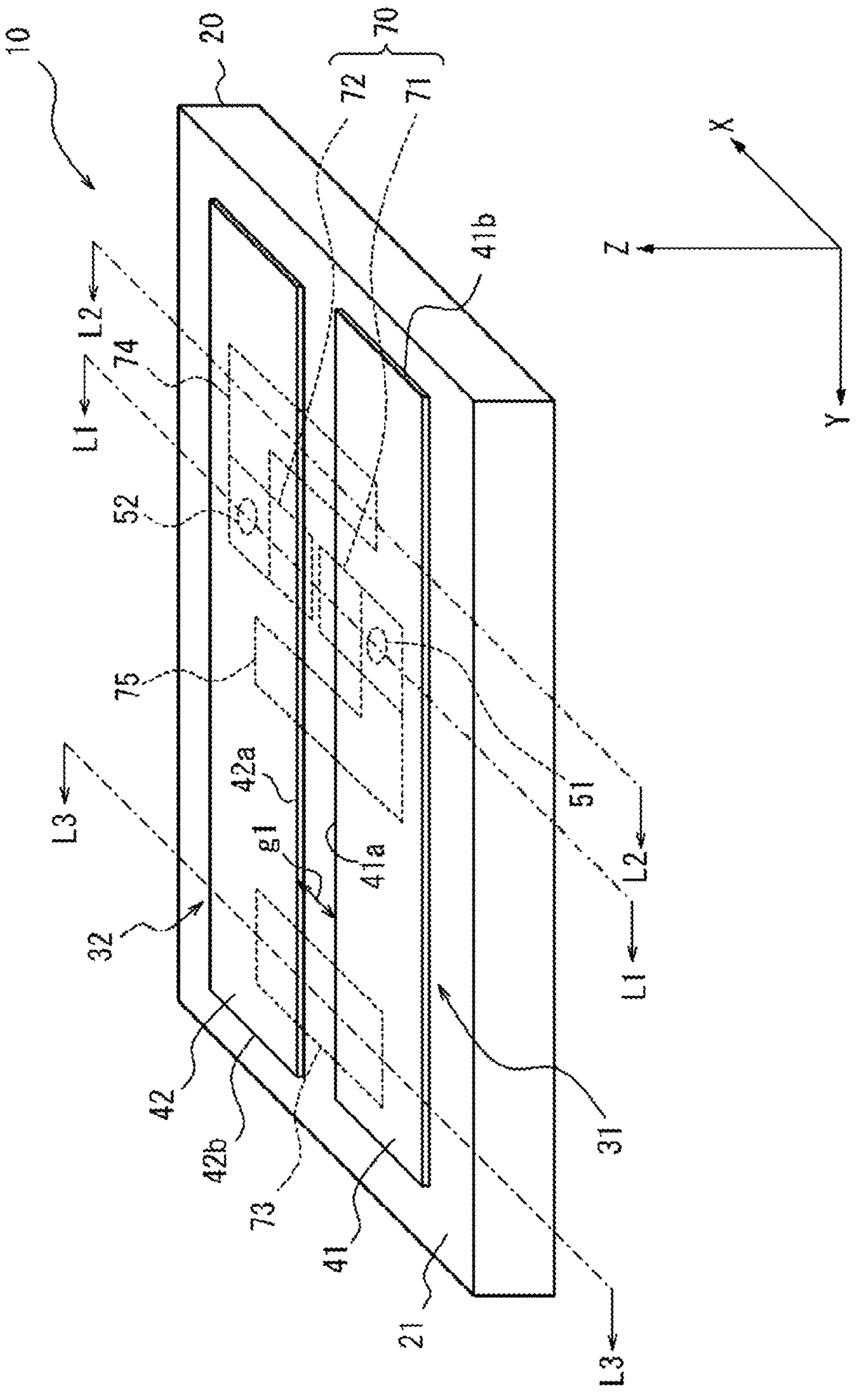
FIG. 1 is a perspective view of an antenna according to an embodiment.

There is room for improvement in the conventional technique for reducing mutual coupling between the antenna elements.

The present disclosure relates to providing an antenna, a wireless communication module, and a wireless communication device with reduced mutual coupling between antenna elements.

According to the antenna, the wireless communication module, and the wireless communication device according to an embodiment of the present disclosure, the mutual coupling between the antenna elements can be reduced.

In the present disclosure, a "dielectric material" may include either a ceramic material or a resin material as a composition. The ceramic material includes an aluminum oxide sintered body, an aluminum nitride sintered body, a mullite sintered body, a glass ceramic sintered body, a crystallized glass obtained by precipitating a crystal component in a glass base material, and microcrystalline sintered body such as mica or aluminum titanate. The resin material includes a material obtained by curing an uncured material such as an epoxy resin, a polyester resin, a polyimide resin, a polyamide-imide resin, a polyetherimide resin, and a liquid crystal polymer.

In the present disclosure, a "conductive material" can include, as a composition, any of a metallic material, a metallic alloy, a cured material of metallic paste, and a conductive polymer. The metallic material includes copper, silver, palladium, gold, platinum, aluminum, chromium, nickel, cadmium lead, selenium, manganese, tin, vanadium, lithium, cobalt, titanium, and the like. The alloy includes a plurality of metallic materials. The metallic paste includes a paste formed by kneading the powder of a metallic material along with an organic solvent and a binder. The binder includes an epoxy resin, a polyester resin, a polyimide resin, a polyamide-imide resin, and a polyetherimide resin. The conductive polymer includes a polythiophene-based polymer, a polyacetylene-based polymer, a polyaniline-based polymer, a polypyrrole-based polymer, and the like.

Hereinafter, a plurality of embodiments of the present disclosure will be described with reference to the drawings. In the components illustrated in FIGS. 1 to 14, the same components are designated by the same reference numerals.

In the embodiments of the present disclosure, a plane on which a first antenna element 31 and a second antenna element 32 illustrated in FIG. 1 extend is represented as an XY plane. A direction from a first ground conductor 61 illustrated in FIG. 2 toward a first radiation conductor 41 illustrated in FIG. 1 is represented as a positive direction of a Z axis. The opposite direction is represented as a negative direction of the Z axis. In the embodiments of the present disclosure, when a positive direction of an X axis and a negative direction of the X axis are not particularly distinguished, the positive direction of the X axis and the negative direction of the X axis are collectively referred to as "X direction". When a positive direction of a Y axis and a negative direction of the Y axis are not particularly distinguished, the positive direction of the Y axis and the negative direction of the Y axis are collectively referred to as "Y direction". When the positive direction of the Z axis and the negative direction of the Z axis are not particularly distinguished, the positive direction of the Z axis and the negative direction of the Z axis are collectively referred to as "Z direction".

Figure 2:
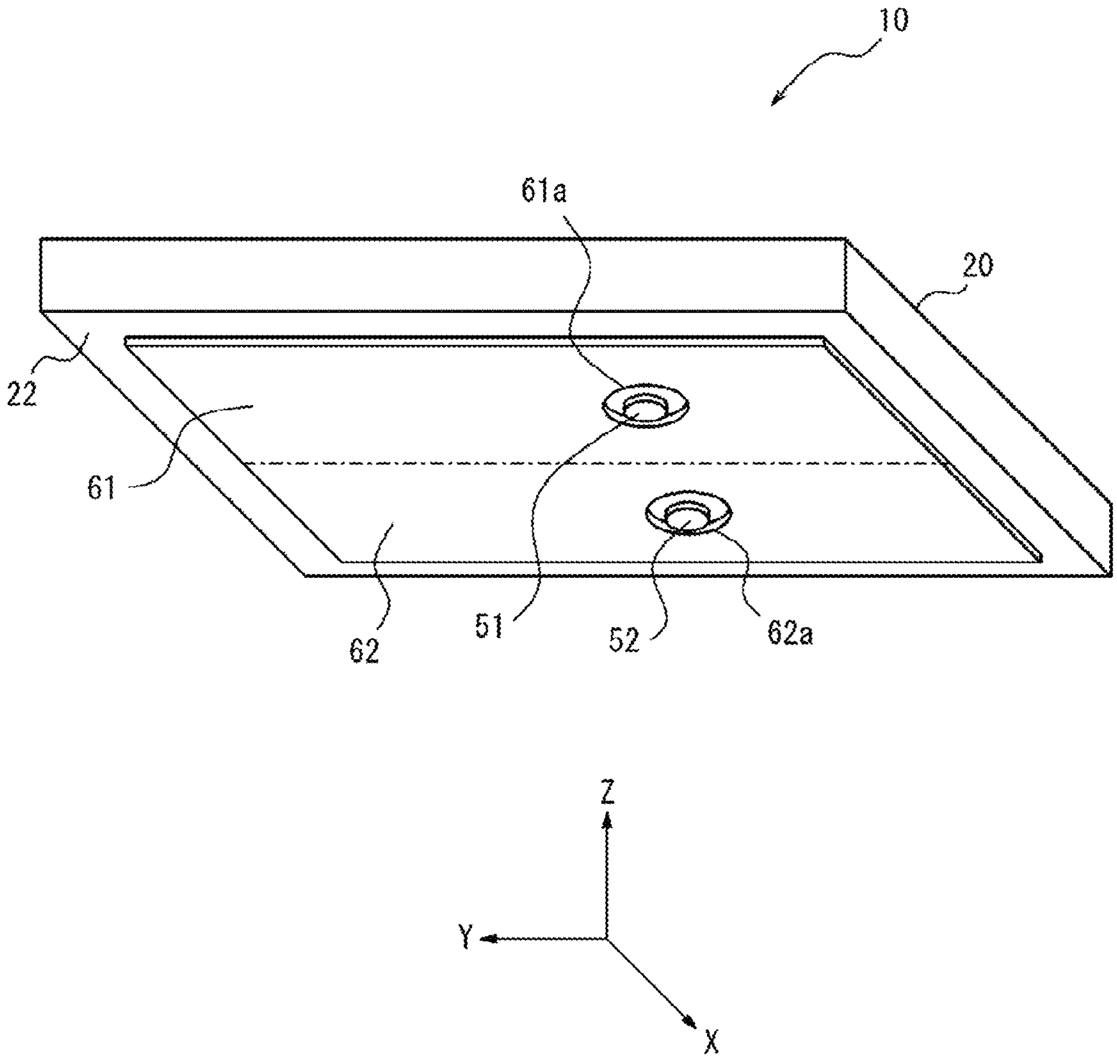
FIG. 2 is a perspective view of the antenna illustrated in FIG. 1 as viewed from a negative direction side of a Z axis.
Figure 3:
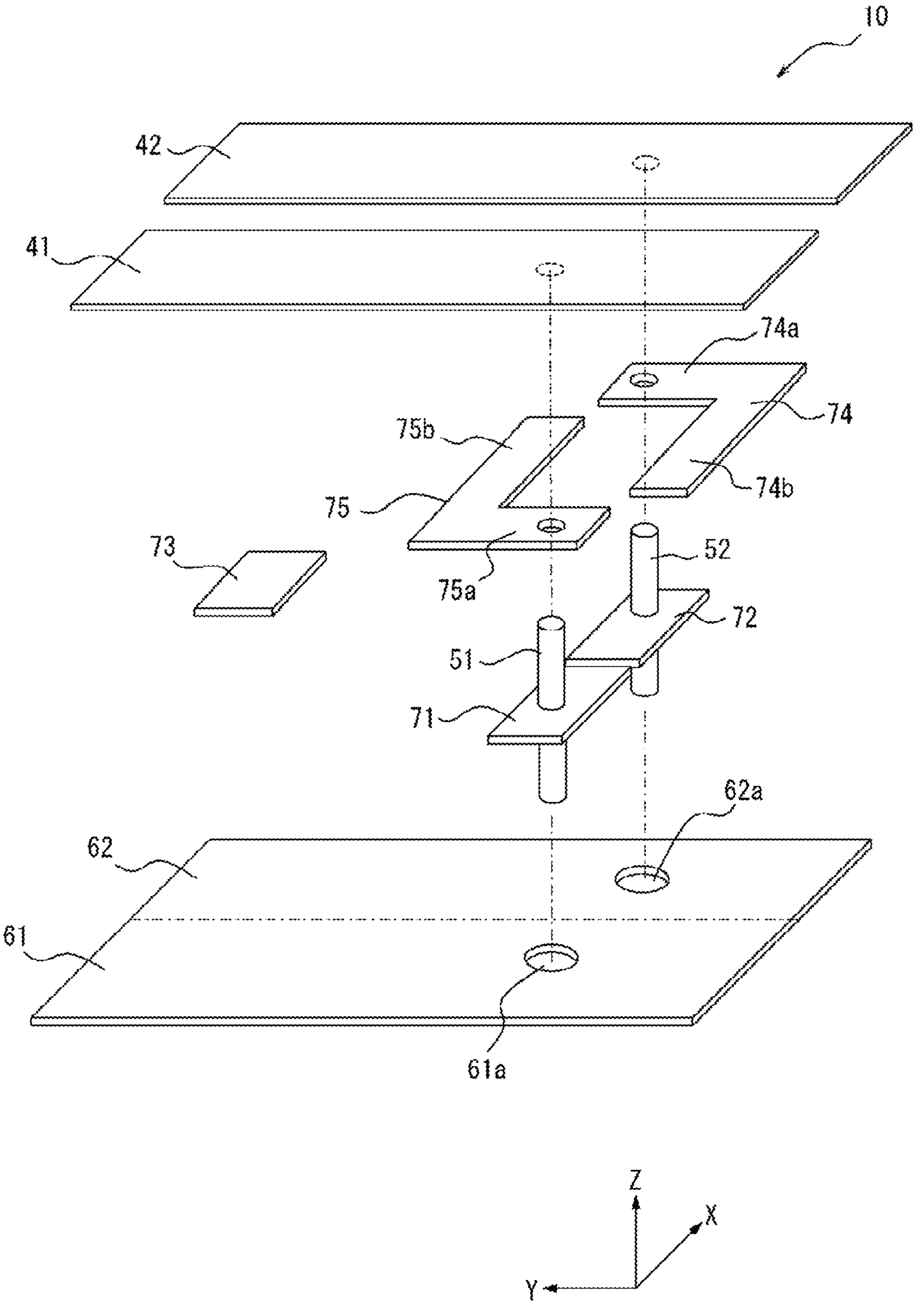
FIG. 3 is an exploded perspective view of a portion of the antenna illustrated in FIG. 1.
Figure 4:
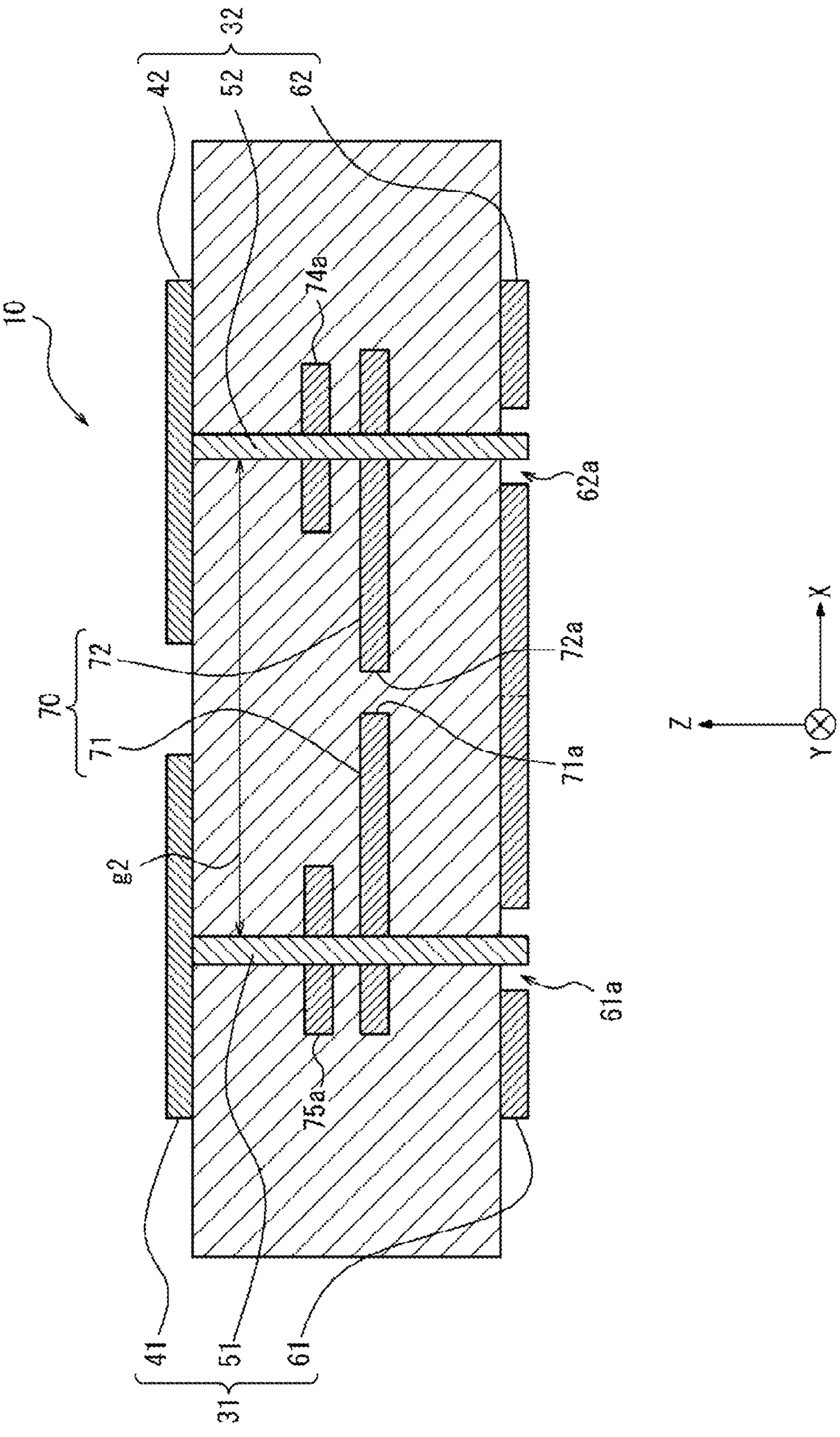
FIG. 4 is a cross-sectional view of the antenna taken along line L1-L1 illustrated in FIG. 1.
Figure 5:
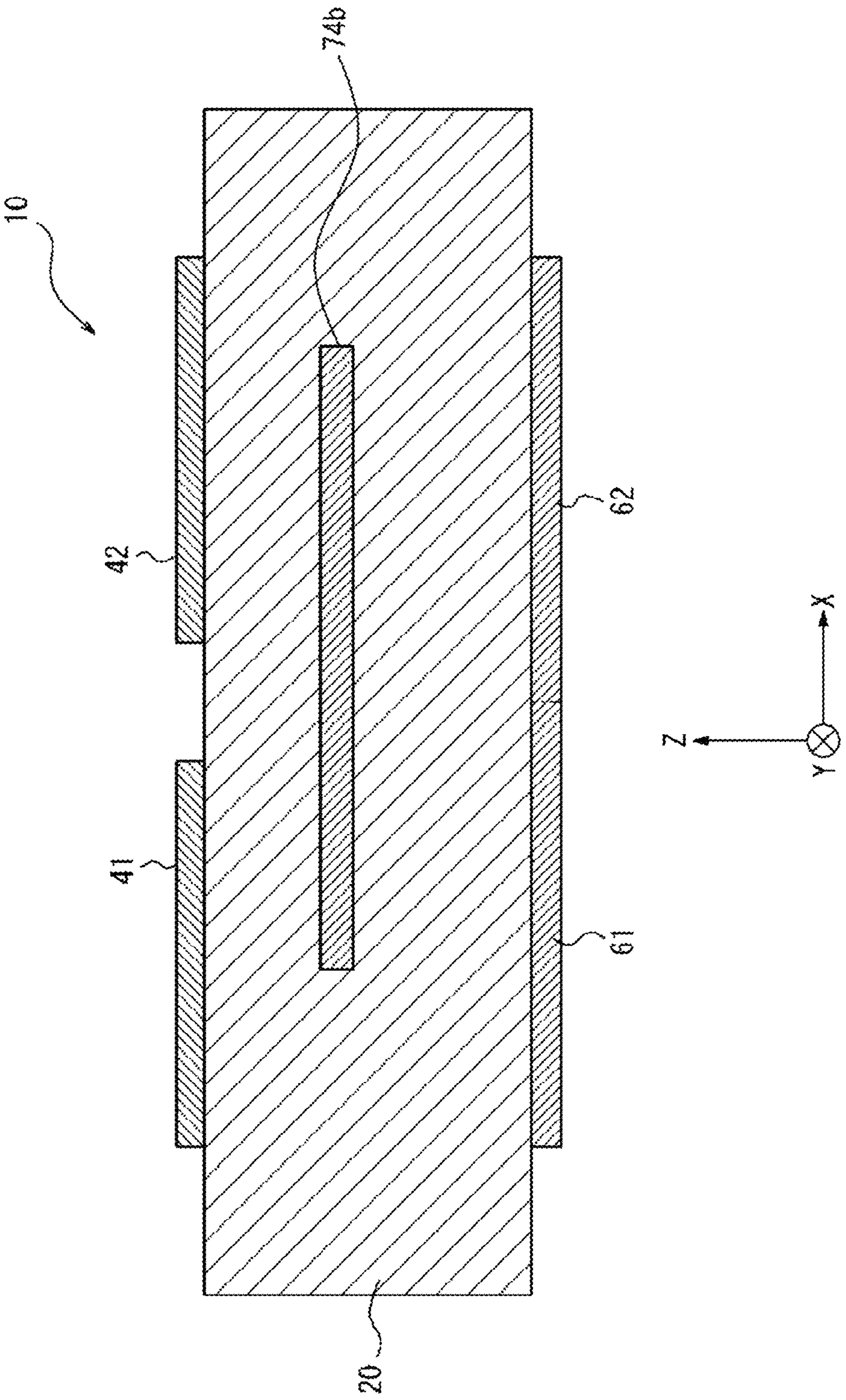
FIG. 5 is a cross-sectional view of the antenna taken along line L2-L2 illustrated in FIG. 1.
Figure 6:
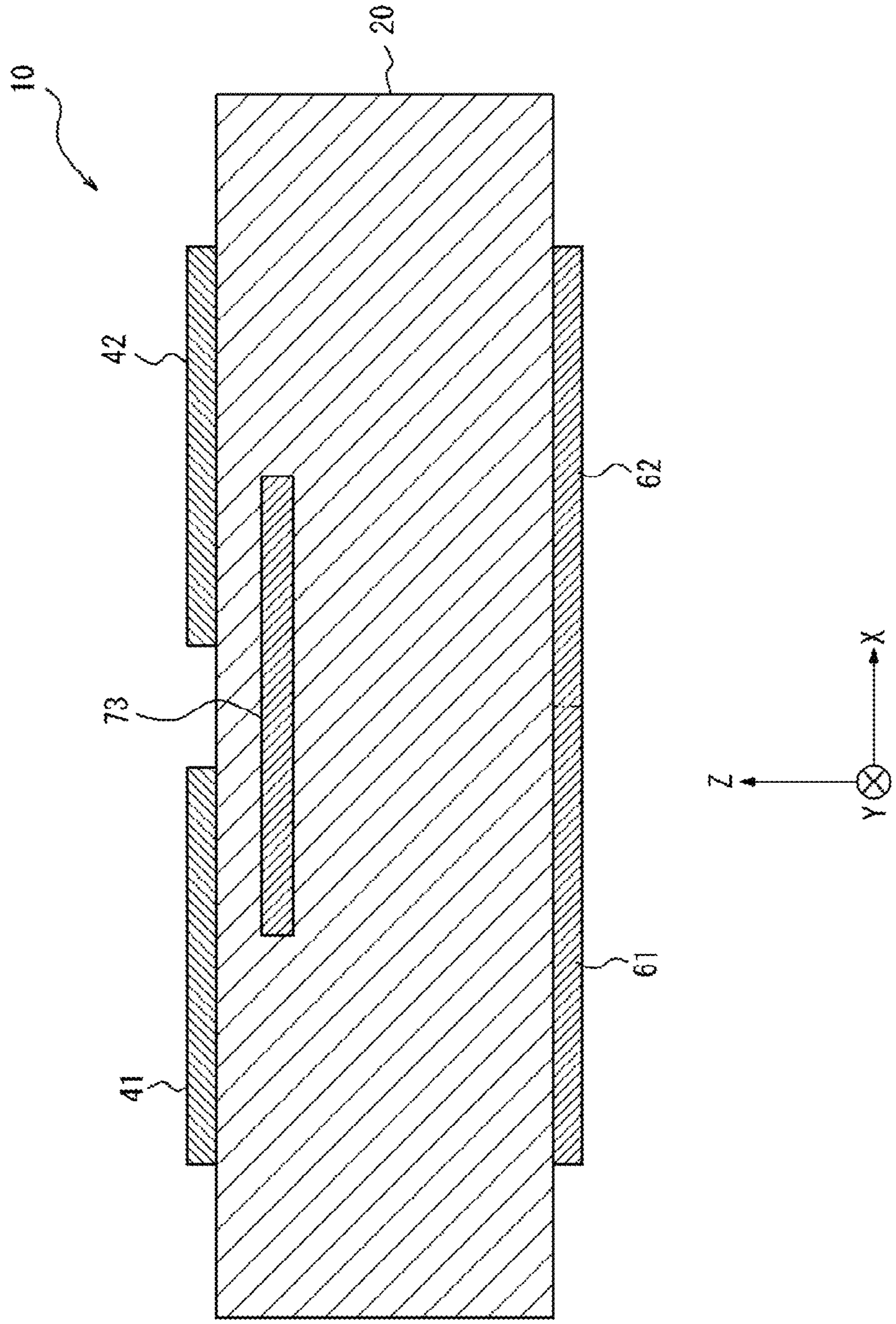
FIG. 6 is a cross-sectional view of the antenna taken along line L3-L3 illustrated in FIG. 1.

FIG. 1 is a perspective view of an antenna 10 according to an embodiment. FIG. 2 is a perspective view of the antenna 10 illustrated in FIG. 1 as viewed from the negative direction side of the Z axis. FIG. 3 is an exploded perspective view of a portion of the antenna 10 illustrated in FIG. 1. FIG. 4 is a cross-sectional view of the antenna 10 taken along line L1-L1 illustrated in FIG. 1. FIG. 5 is a cross-sectional view of the antenna 10 taken along line L2-L2 illustrated in FIG. 1. FIG. 6 is a cross-sectional view of the antenna 10 taken along line L3-L3 illustrated in FIG. 1.

As illustrated in FIG. 1, the antenna 10 includes a base 20, a first antenna element 31, a second antenna element 32, a first coupler 70, and a first coupling portion 74. The antenna 10 may further include a second coupler 73 and a second coupling portion 75.

The base 20 is configured to support the first antenna element 31 and the second antenna element 32. The base 20 is a quadrangular prism as illustrated in FIGS. 1 and 2. However, the base 20 may have any shape as long as it can support the first antenna element 31 and the second antenna element 32.

The base 20 may include a dielectric material. A relative permittivity of the base 20 may be appropriately adjusted according to a desired resonance frequency of the antenna 10. The base 20 includes an upper surface 21 and a lower surface 22 as illustrated in FIGS. 1 and 2.

The first antenna element 31 is configured to resonate in a first frequency band. The second antenna element 32 is configured to resonate in a second frequency band. The first frequency band and the second frequency band may belong to the same frequency band or different frequency bands, depending on the use of the antenna 10 and the like. The first antenna element 31 can resonate in the same frequency band as the second antenna element 32. The first antenna element 31 can resonate in a frequency band different from that of the second antenna element 32.

The first antenna element 31 may be configured to resonate in the same phase as the second antenna element 32. A first feeder line 51 and a second feeder line 52 may be configured to feed signals that excite the first antenna element 31 and the second antenna element 32 in the same phase. When the first antenna element 31 and the second antenna element 32 are excited in the same phase, the signal fed from the first feeder line 51 to the first antenna element 31 may have the same phase as the signal fed from the second feeder line 52 to the second antenna element 32. When the first antenna element 31 and the second antenna element 32 are excited in the same phase, the signal fed from the first feeder line 51 to the first antenna element 31 may have a different phase from the signal fed from the second feeder line 52 to the second antenna element 32.

The first antenna element 31 may be configured to resonate in a phase different from that of the second antenna element 32. The first feeder line 51 and the second feeder line 52 may be configured to feed signals that excite the first antenna element 31 and the second antenna element 32 in different phases. When the first antenna element 31 and the second antenna element 32 are excited in different phases, the signal fed from the first feeder line 51 to the first antenna element 31 may have the same phase as the signal fed from the second feeder line 52 to the second antenna element 32. When the first antenna element 31 and the second antenna element 32 are excited in different phases, the signal fed from the first feeder line 51 to the first antenna element 31 may have a different phase from the signal fed from the second feeder line 52 to the second antenna element 32.

As illustrated in FIG. 4, the first antenna element 31 includes a first radiation conductor 41 and the first feeder line 51. The first antenna element 31 may further include a first ground conductor 61. The first antenna element 31 serves as a microstrip type antenna by including the first ground conductor 61. As illustrated in FIG. 4, the second antenna element 32 includes a second radiation conductor 42 and the second feeder line 52. The second antenna element 32 may further include a second ground conductor 62. The second antenna element 32 serves as a microstrip type antenna by including the second ground conductor 62.

The first radiation conductor 41 illustrated in FIG. 1 is configured to radiate power supplied from the first feeder line 51 as an electromagnetic wave. The first radiation conductor 41 is configured to supply electromagnetic waves from the outside as power to the first feeder line 51. The second radiation conductor 42 illustrated in FIG. 1 is configured to radiate power supplied from the second feeder line 52 as electromagnetic waves. The second radiation conductor 42 is configured to supply electromagnetic waves from the outside as power to the second feeder line 52.

Each of the first radiation conductor 41 and the second radiation conductor 42 may include a conductive material. Each of the first radiation conductor 41, the second radiation conductor 42, the first feeder line 51, the second feeder line 52, the first ground conductor 61, the second ground conductor 62, the first coupler 70, the first coupling portion 74, and the second coupling portion 75 may include the same conductive material, or may include different conductive materials.

The first radiation conductor 41 and the second radiation conductor 42 may have a flat plate shape as illustrated in FIG. 1. The first radiation conductor 41 and the second radiation conductor 42 can extend along the XY plane. The first radiation conductor 41 and the second radiation conductor 42 are located on the upper surface 21 of the base 20. The first radiation conductor 41 and the second radiation conductor 42 may be located partially in the base 20.

In the present embodiment, the first radiation conductor 41 and the second radiation conductor 42 have the same rectangular shape. However, the first radiation conductor 41 and the second radiation conductor 42 may have any shape. In addition, the first radiation conductor 41 and the second radiation conductor 42 may have different shapes.

A longitudinal direction of the first radiation conductor 41 and the second radiation conductor 42 is along the Y direction. A lateral direction of the first radiation conductor 41 and the second radiation conductor 42 is along the X direction. The first radiation conductor 41 includes a long side 41*a* and a short side 41*b*. The second radiation conductor 42 includes a long side 42*a* and a short side 42*b*.

The first radiation conductor 41 and the second radiation conductor 42 are arranged so that the long side 41*a* and the long side 42*a* face each other. However, the arrangement of the first radiation conductor 41 and the second radiation conductor 42 is not limited thereto. For example, the first radiation conductor 41 and the second radiation conductor 42 may be arranged side by side so that a portion of the long side 41*a* and a portion of the long side 42*a* face each other. For example, the first radiation conductor 41 and the second radiation conductor 42 may be arranged to be shifted in the Y direction.

The first radiation conductor 41 and the second radiation conductor 42 may be arranged side by side so that the short side 41*b* and the short side 42*b* face each other. However, the arrangement of the first radiation conductor 41 and the second radiation conductor 42 is not limited thereto. For example, the first radiation conductor 41 and the second radiation conductor 42 may be arranged side by side so that a portion of the short side 41*b* and a portion of the short side 42*b* face each other. For example, the first radiation conductor 41 and the second radiation conductor 42 may be arranged with the short side 41*b* and the short side 42*b* facing each other being shift from each other.

The first radiation conductor 41 and the second radiation conductor 42 are arranged at an interval equal to or less than ½ of the resonance wavelength of the antenna 10. In the present embodiment, as illustrated in FIG. 1, the first radiation conductor 41 and the second radiation conductor 42 are arranged so that a gap g1 between the long side 41*a* and the long side 42*a* facing each other is equal to or less than ½ of the resonance wavelength of the antenna 10. However, the arrangement of the first radiation conductor 41 and the second radiation conductor 42 at an interval equal to or less than ½ of the resonance wavelength of the antenna 10 is not limited thereto. For example, in a configuration in which the first radiation conductor 41 and the second radiation conductor 42 are arranged so that the short side 41*b* and the short side 42*b* face each other, a gap between the short side 41*b* and the short side 42*b* may be equal to or less than ½ of the resonance wavelength of the antenna 10.

A current can flow through the first radiation conductor 41 along the Y direction. When the current flows through the first radiation conductor 41 along the Y direction, a magnetic field surrounding the first radiation conductor 41 changes in the XZ plane. A current can flow through the second radiation conductor 42 along the Y direction. When the current flows through the second radiation conductor 42 along the Y direction, a magnetic field surrounding the second radiation conductor 42 changes in the XZ plane. The magnetic field surrounding the first radiation conductor 41 and the magnetic field surrounding the second radiation conductor 42 interact with each other. For example, when the first radiation conductor 41 and the second radiation conductor 42 are excited in the same phase or phases close to each other, most of the currents flowing through the first radiation conductor 41 and the second radiation conductor 42 can flow in the same direction. Examples of the phases close to each other include cases where both phases are within ±60°, within ±45°, and within ±30°. When most of the currents flowing through the first radiation conductor 41 and the second radiation conductor 42 flow in the same direction, magnetic field coupling between the first radiation conductor 41 and the second radiation conductor 42 can be large. The first radiation conductor 41 and the second radiation conductor 42 can be configured so that the magnetic field coupling becomes large by flowing most of the flowing currents in the same direction.

When the resonance frequencies of the first radiation conductor 41 and the second radiation conductor 42 are the same or close to each other, the first radiation conductor 41 and the second radiation conductor 42 may be configured so that a coupling occurs at the time of resonance. The coupling at the time of resonance can be referred to as "even mode" and "odd mode". The even mode and the odd mode are also collectively referred to as the "even-odd mode". When the first radiation conductor 41 and the second radiation conductor 42 resonate in the even-odd mode, each of the first radiation conductor 41 and the second radiation conductor 42 resonates at a resonance frequency different from the case where they do not resonate in the even-odd mode. In many cases in which the first radiation conductor 41 and the second radiation conductor 42 are coupled, magnetic field coupling and electric field coupling occur at the same time. If one of the magnetic field coupling and the electric field coupling becomes dominant, the coupling between the first radiation conductor 41 and the second radiation conductor can finally be regarded as the dominant one of the magnetic field coupling or the electric field coupling.

The second radiation conductor 42 is configured to be coupled to the first radiation conductor 41 with a first coupling method in which one of the capacitive coupling and the magnetic field coupling is dominant. In the present embodiment, the first radiation conductor 41 and the second radiation conductor 42 are the microstrip type antennas, and the long side 41*a* and the long side 42*a* face each other. The mutual influence of the magnetic field surrounding the first radiation conductor 41 and the magnetic field surrounding the second radiation conductor 42 is more dominant than the mutual influence due to the electric field between the first radiation conductor 41 and the second radiation conductor 42. The coupling between the first radiation conductor 41 and the second radiation conductor 42 can be considered as the magnetic field coupling. Therefore, in the present embodiment, the second radiation conductor 42 is configured to be coupled to the first radiation conductor 41 with the first coupling method in which the magnetic field coupling is dominant.

The first feeder line 51 illustrated in FIG. 3 is configured to be electrically connected to the first radiation conductor 41. The first feeder line 51 is configured to be coupled to the first radiation conductor 41 such that the inductance component is dominant. However, the first feeder line 51 may be configured to be magnetically coupled to the first radiation conductor 41. When the first feeder line 51 is configured to be magnetically coupled to the first radiation conductor 41, the first feeder line 51 may be configured to be coupled to the first radiation conductor 41 such that the capacitance component is dominant. The first feeder line 51 may extend from an opening 61*a* of the first ground conductor 61 illustrated in FIG. 2 to an external device or the like.

The second feeder line 52 illustrated in FIG. 3 is configured to be electrically connected to the second radiation conductor 42. The second feeder line 52 is configured to be coupled to the second radiation conductor 42 such that the inductance component is dominant. However, the second feeder line 52 may be configured to be magnetically coupled to the second radiation conductor 42. When the second feeder line 52 is configured to be magnetically coupled to the second radiation conductor 42, the second feeder line 52 may be configured to be coupled to the second radiation conductor 42 such that the capacitance component is dominant. The second feeder line 52 can extend from an opening 62*a* of the second ground conductor 62 illustrated in FIG. 2 to an external device or the like.

The first feeder line 51 is configured to supply power to the first radiation conductor 41. The first feeder line 51 is configured to supply the power from the first radiation conductor 41 to an external device or the like. The second feeder line 52 is configured to supply power to the second radiation conductor 42. The second feeder line 52 is configured to supply the power from the second radiation conductor 42 to an external device or the like.

The first feeder line 51 and the second feeder line 52 may include a conductive material. Each of the first feeder line 51 and the second feeder line 52 may be a through-hole conductor, a via conductor, or the like. The first feeder line 51 and the second feeder line 52 may be located in the base 20 as illustrated in FIG. 4. As illustrated in FIG. 3, the first feeder line 51 penetrates through a first conductor 71 of the first coupler 70. As illustrated in FIG. 3, the second feeder line 52 penetrates through a second conductor 72 of the first coupler 70.

As illustrated in FIG. 4, the first feeder line 51 extends in the Z direction in the base 20. The first feeder line 51 is configured so that a current flows along the Z direction. When the current flows through the first feeder line 51 along the Z direction, the magnetic field surrounding the first feeder line 51 changes in the XY plane.

As illustrated in FIG. 4, the second feeder line 52 extends in the Z direction in the base 20. The second feeder line 52 is configured so that a current flows along the Z direction. When the current flows through the second feeder line 52 along the Z direction, the magnetic field surrounding the second feeder line 52 changes in the XY plane.

The magnetic field surrounding the first feeder line 51 and the magnetic field surrounding the second feeder line 52 can interfere with each other. For example, when most of the currents flowing through the first feeder line 51 and the second feeder line 52 flow in the same direction, the magnetic field surrounding the first feeder line 51 and the magnetic field surrounding the second feeder line 52 constructively interfere with each other in a macroscopic manner. The first feeder line 51 and the second feeder line 52 can be magnetically coupled by interference between the magnetic field surrounding the first feeder line 51 and the magnetic field surrounding the second feeder line 52.

The second feeder line 52 is configured to be coupled to the first feeder line 51 such that a first component is dominant. The first component is one of the capacitance component and the inductance component. The first feeder line 51 and the second feeder line 52 can be magnetically coupled by interference between the magnetic field surrounding the first feeder line 51 and the magnetic field surrounding the second feeder line 52. The second feeder line 52 is configured to be coupled to the first feeder line 51 such that the inductance component serving as the first component is dominant.

The first ground conductor 61 illustrated in FIG. 2 is configured to provide a reference potential in the first antenna element 31. The second ground conductor 62 illustrated in FIG. 2 is configured to provide a reference potential in the second antenna element 32. Each of the first ground conductor 61 and the second ground conductor 62 may be configured to be electrically connected to a ground of the device including the antenna 10.

The first ground conductor 61 and the second ground conductor 62 may include a conductive material. The first ground conductor 61 and the second ground conductor 62 may have a flat plate shape. The first ground conductor 61 and the second ground conductor 62 are located on the lower surface 22 of the base 20. The first ground conductor 61 and the second ground conductor 62 may be located partially in the base 20.

The first ground conductor 61 may be connected to the second ground conductor 62. For example, the first ground conductor 61 may be configured to be electrically connected to the second ground conductor 62. The first ground conductor 61 and the second ground conductor 62 may be formed integrally as illustrated in FIG. 2. The first ground conductor 61 and the second ground conductor 62 may be integrated with a single base 20. However, the first ground conductor 61 and the second ground conductor 62 may be independent and separate members. When the first ground conductor 61 and the second ground conductor 62 are independent and separate members, each of the first ground conductor 61 and the second ground conductor 62 can be integrated with the base 20 separately.

The first ground conductor 61 and the second ground conductor 62 extend along the XY plane, as illustrated in FIG. 2. Each of the first ground conductor 61 and the second ground conductor 62 is separated from each of the first radiation conductor 41 and the second radiation conductor 42 in the Z direction. As illustrated in FIG. 4, the base 20 is interposed between the first ground conductor 61 and the second ground conductor 62 and the first radiation conductor 41 and the second radiation conductor 42. The first ground conductor 61 faces the first radiation conductor 41 in the Z direction. The second ground conductor 62 faces the second radiation conductor 42 in the Z direction. The first ground conductor 61 and the second ground conductor 62 have a rectangular shape according to the first radiation conductor 41 and the second radiation conductor 42. However, the first ground conductor 61 and the second ground conductor 62 may have any shape according to the first radiation conductor 41 and the second radiation conductor 42.

The first coupler 70 is configured to couple the first feeder line 51 and the second feeder line 52 such that a second component different from the first component is dominant. When the first component is an inductance component, the second component is a capacitance component. The first coupler 70 is configured to couple the first feeder line 51 and the second feeder line 52 such that the capacitance component serving as the second component is dominant.

For example, the first coupler 70 includes the first conductor 71 and the second conductor 72, as illustrated in FIG. 4. Each of the first conductor 71 and the second conductor 72 may include a conductive material. Each of the first conductor 71 and the second conductor 72 extends along the XY plane. Each of the first conductor 71 and the second conductor 72 has a flat plate shape as illustrated in FIG. 3. The first conductor 71 is configured to be electrically connected to the first feeder line 51 penetrating through the first conductor 71. The second conductor 72 is configured to be electrically connected to the second feeder line 52 penetrating through the second conductor 72. As illustrated in FIG. 4, an end portion 71*a* of the first conductor 71 and an end portion 72*a* of the second conductor 72 face each other. The end portion 71*a* of the first conductor 71 and the end portion 72*a* of the second conductor 72 can configure a capacitor via the base 20. By configuring the capacitor, the first coupler 70 is configured to couple the first feeder line 51 and the second feeder line 52 such that the capacitance component serving as the second component is dominant.

When the first feeder line 51 directly feeds power to the first radiation conductor 41 and the second feeder line 52 directly feeds power to the second radiation conductor 42, in the coupling between the first feeder line 51 and the second feeder line 52, the inductance component may be dominant. The inductance component in the coupling between the first feeder line 51 and the second feeder line 52 forms a parallel circuit with the capacitance component due to the first coupler 70. In the antenna 10, an anti-resonance circuit including the inductance component and the capacitance component is configured. The anti-resonance circuit can cause an attenuation pole in transmission characteristics between the first antenna element 31 and the second antenna element 32. The transmission characteristics are characteristics of power transmitted from the first feeder line 51, which is an input port of the first antenna element 31, to the second feeder line 52, which is an input port of the second antenna element 32. By causing the attenuation pole in the transmission characteristics, the interference between the first antenna element 31 and the second antenna element 32 can be reduced in the antenna 10.

In this way, the first coupler 70 is configured to couple the first feeder line 51, which is the input port of the first antenna element 31, and the second feeder line 52, which is the input port of the second antenna element 32, such that the second component is dominant. The second component is different from the first component, which is dominant in the coupling between the first feeder line 51 itself and the second feeder line 52 itself. The first component and the second component forms a parallel circuit, so that the antenna 10 has an anti-resonance circuit at the input port.

The second coupler 73 is configured to couple the first radiation conductor 41 and the second radiation conductor 42 with a second coupling method different from the first coupling method. When the first coupling method is a coupling method in which magnetic field coupling is dominant, the second coupling method is a coupling method in which capacitive coupling is dominant. The second coupler 73 is configured to couple the first radiation conductor 41 and the second radiation conductor 42 with the second coupling method in which the capacitive coupling is dominant.

For example, the second coupler 73 may include a conductive material. The second coupler 73 is located in the base 20 as illustrated in FIG. 6. The second coupler 73 is separated from the first radiation conductor 41 and the second radiation conductor 42 in the Z direction. The second coupler 73 extends along the XY plane, as illustrated in FIG. 1. In the XY plane, a portion of the second coupler 73 may overlap a portion of the first radiation conductor 41. The portion of the second coupler 73 and the portion of the first radiation conductor 41 that overlap can configure a capacitor via the base 20. In the XY plane, a portion of the second coupler 73 may overlap a portion of the second radiation conductor 42. The portion of the second coupler 73 and the portion of the second radiation conductor 42 that overlap can configure a capacitor via the base 20. The first radiation conductor 41 and the second radiation conductor 42 can be coupled through the capacitor configured by the first radiation conductor 41 and the second coupler 73 and the capacitor configured by the second radiation conductor 42 and the second coupler 73. The second coupler 73 is configured to couple the first radiation conductor 41 and the second radiation conductor 42 with the second coupling method in which the capacitive coupling is dominant.

The electric field is large at both ends of the first radiation conductor 41 and both ends of the second radiation conductor 42. When most of the currents flowing through the first radiation conductor 41 and the second radiation conductor 42 flow in an inverse direction, a potential difference between the first radiation conductor 41 and the second radiation conductor 42 becomes large. The magnitude of the capacitive coupling with the second coupling method changes depending on the position where the second coupler 73 faces each of the first radiation conductor 41 and the second radiation conductor 42. The magnitude of the capacitive coupling with the second coupling method can be adjusted by the position and the area where the second coupler 73 faces each of the first radiation conductor 41 and the second radiation conductor 42.

The first coupling portion 74 is configured to couple the first radiation conductor 41 and the second feeder line 52. The first coupling portion 74 may be configured to couple the first radiation conductor 41 and the second feeder line 52 such that one of the capacitance component and the inductance component is dominant, depending on the configuration of the first radiation conductor 41 and the second feeder line 52. In the present embodiment, the second feeder line 52 is configured to be connected to the first radiation conductor 41 such that the inductance component serving as a third component is dominant. Therefore, the first coupling portion 74 is configured to couple the first radiation conductor 41 and the second feeder line 52 such that the capacitance component serving as a fourth component different from the third component is dominant.

For example, the first coupling portion 74 may include a conductive material. The first coupling portion 74 is located in the base 20. The first coupling portion 74 is separated from each of the first radiation conductor 41 and the second radiation conductor 42 in the Z direction. The first coupling portion 74 may be L-shaped, as illustrated in FIG. 3. The L-shaped first coupling portion 74 includes a piece 74*a* and a piece 74*b*. As illustrated in FIG. 3, the second feeder line 52 penetrates through the piece 74*a*. The piece 74*a* is configured to be electrically connected to the second feeder line 52 by penetrating through the second feeder line 52. As illustrated in FIG. 3, the piece 74*b* overlaps a portion of the first radiation conductor 41 in the XY plane as illustrated in FIG. 5 by extending from an end portion of the piece 74*a* on a negative direction side of a Y axis toward a negative direction of an X axis. The first coupling portion 74 is configured to be capacitively coupled to the first radiation conductor 41 by overlapping the piece 74*b* with a portion of the first radiation conductor 41 in the XY plane. The first coupling portion 74 is configured to couple the first radiation conductor 41 and the second feeder line 52 such that the capacitance component serving as the fourth component is dominant, by electrically connecting the piece 74*a* with the second feeder line 52 and capacitively connecting the piece 74*b* with the first radiation conductor 41.

The second coupling portion 75 is configured to couple the second radiation conductor 42 and the first feeder line 51. The second coupling portion 75 may be configured to couple the second radiation conductor 42 and the first feeder line 51 such that one of the capacitance component and the inductance component is dominant, depending on the configuration of the second radiation conductor 42 and the first feeder line 51. In the present embodiment, the first feeder line 51 is configured to be connected to the second radiation conductor 42 such that the inductance component serving as a fifth component is dominant. Therefore, the second coupling portion 75 is configured to couple the second radiation conductor 42 and the first feeder line 51 such that the capacitance component serving as a sixth component different from the fifth component is dominant.

For example, the second coupling portion 75 may include a conductive material. The second coupling portion 75 is located in the base 20. The second coupling portion 75 is separated from each of the first radiation conductor 41 and the second radiation conductor 42 in the Z direction. The second coupling portion 75 may be L-shaped, as illustrated in FIG. 3. The L-shaped second coupling portion 75 includes a piece 75*a* and a piece 75*b*. In the second coupling portion 75, the piece 75*a* is electrically connected to the first feeder line 51, and the piece 75*b* is capacitively coupled to the second radiation conductor 42. With such a configuration, the second coupling portion 75 is configured to couple the second radiation conductor 42 and the first feeder line 51 such that the capacitance component serving as the sixth component is dominant, in the same as or similar to the first coupling portion 74.

As described above, in the antenna 10 according to the present embodiment, the second feeder line 52 is configured to be coupled to the first feeder line 51 such that the inductance component serving as the first component is dominant. The first coupler 70 is configured to couple the first feeder line 51 and the second feeder line 52 such that the capacitance component serving as the second component is dominant. A coupling coefficient $K_1$ due to the capacitance component and the inductance component between the first feeder line 51 and the second feeder line 52 can be calculated by using a coupling coefficient $Ke_1$ and a coupling coefficient $Km_1$. The coupling coefficient $Ke_1$ is a coupling coefficient due to the capacitance component between the first feeder line 51 and the second feeder line 52. The coupling coefficient $Km_1$ is a coupling coefficient due to an inductance component between the first feeder line 51 and the second feeder line 52. For example, the relationship between the coupling coefficient $K_1$ and the coupling coefficients $Ke_1$ and $Km_1$ is expressed by Equation: $K_1=(Ke_1^2-Km_1^2)/(Ke_1^2+Km_1^2)$ The coupling coefficient $Km_1$ can be determined according to the configuration of the first feeder line 51 and the second feeder line 52. For example, the coupling coefficient $Km_1$ can change in response to a change in a length of a gap g2 between the first feeder line 51 and the second feeder line 52 illustrated in FIG. 4 in the X direction. In the antenna 10, the magnitude of the coupling coefficient $Ke_1$ can be adjusted by appropriately configuring the first coupler 70. In the antenna 10, by adjusting the magnitude of the coupling coefficient $Ke_1$ according to the coupling coefficient $Km_1$, the degree to which the coupling coefficient $Km_1$ and the coupling coefficient $Ke_1$ cancel each other can be changed. In the antenna 10, with the coupling coefficient $Ke_1$ having a magnitude corresponding to the coupling coefficient $Km_1$, the coupling coefficient $Km_1$ and the coupling coefficient $Ke_1$ cancel each other, and the coupling coefficient $K_1$ can be reduced. By reducing the coupling coefficient $K_1$, in the antenna 10, the mutual coupling between the first feeder line 51 and the second feeder line 52 can be reduced. By reducing the mutual coupling between the first feeder line 51 and the second feeder line 52, each of the first antenna element 31 and the second antenna element 32 can efficiently radiate electromagnetic waves by the power from each of the first feeder line 51 and the second feeder line 52.

In the antenna 10 according to the present embodiment, the second radiation conductor 42 is configured to be coupled to the first radiation conductor 41 with the first coupling method in which the magnetic field coupling is dominant. The second coupler 73 is configured to couple the first radiation conductor 41 and the second radiation conductor 42 with the second coupling method in which the capacitive coupling is dominant. A coupling coefficient $K_2$ due to the capacitive coupling and the magnetic field coupling between the first radiation conductor 41 and the second radiation conductor 42 can be calculated by using a coupling coefficient $Ke_2$ and a coupling coefficient $Km_2$. The coupling coefficient $Ke_2$ is a coupling coefficient of the capacitive coupling between the first radiation conductor 41 and the second radiation conductor 42. The coupling coefficient $Km_2$ is a coupling coefficient of the magnetic field coupling between the first radiation conductor 41 and the second radiation conductor 42. For example, the relationship between the coupling coefficient $K_2$ and the coupling coefficients $Ke_2$ and $Km_2$ is expressed by Equation: $K_2=(Ke_2^2-Km_2^2)/(Ke_2^2+Km_2^2)$.

The coupling coefficient $Km_2$ can be determined according to the configuration of the first radiation conductor 41 and the second radiation conductor 42. For example, a configuration in which the first radiation conductor 41 and the second radiation conductor 42 are arranged in the Y direction as illustrated in FIG. 1 and a configuration in which the first radiation conductor 41 and the second radiation conductor 42 are arranged to be shifted in the Y direction can be different from each other in the coupling coefficient $Km_2$. The coupling coefficient $Km_2$ can change in response to a change in a length of the gap g1 illustrated in FIG. 1 in the X direction. In the antenna 10, the magnitude of the coupling coefficient $Ke_2$ can be adjusted by appropriately configuring the second coupler 73. In the antenna 10, by adjusting the magnitude of the coupling coefficient $Ke_2$ according to the coupling coefficient $Km_2$, the degree to which the coupling coefficient $Km_2$ and the coupling coefficient $Ke_2$ cancel each other can be changed. In the antenna 10, the coupling coefficient $Km_2$ and the coupling coefficient $Ke_2$ cancel each other, and the coupling coefficient $K_2$ can be reduced. By reducing the coupling coefficient $K_2$, in the antenna 10, the mutual coupling between the first radiation conductor 41 and the second radiation conductor 42 can be reduced. By reducing the mutual coupling between the first radiation conductor 41 and the second radiation conductor 42, each of the first antenna element 31 and the second antenna element 32 can efficiently radiate electromagnetic waves from each of the first radiation conductor 41 and the second radiation conductor 42.

In the antenna 10 according to the present embodiment, the second feeder line 52 is configured to be coupled to the first radiation conductor 41 such that the inductance component serving as the third component is dominant. The first coupling portion 74 is configured to couple the first radiation conductor 41 and the second feeder line 52 such that the capacitance component serving as the fourth component different from the third component is dominant. A coupling coefficient $K_3$ due to the capacitance component and the inductance component between the first radiation conductor 41 and the second feeder line 52 can be reduced by canceling a coupling coefficient $Ke_3$ and a coupling coefficient $Km_3$ each other. The coupling coefficient $Ke_3$ is a coupling coefficient due to the capacitance component between the first radiation conductor 41 and the second feeder line 52. The coupling coefficient $Km_3$ is a coupling coefficient due to the inductance component between the first radiation conductor 41 and the second feeder line 52.

The coupling coefficient $Km_3$ can be determined according to the configuration of the first radiation conductor 41 and the second feeder line 52. In the antenna 10, the magnitude of the coupling coefficient $Ke_3$ can be adjusted by appropriately configuring the first coupling portion 74. In the antenna 10, by the first coupling portion 74 adjusting the magnitude of the coupling coefficient $Ke_3$ according to the coupling coefficient $Km_3$, the degree to which the coupling coefficient $Km_3$ and the coupling coefficient $Ke_3$ cancel each other can be changed. In the antenna 10, by configuring the first coupling portion 74 as appropriate, the coupling coefficient $Km_3$ and the coupling coefficient $Ke_3$ can cancel each other, and the coupling coefficient $K_3$ can be reduced. By reducing the coupling coefficient $K_3$, the mutual coupling between the first radiation conductor 41 and the second feeder line 52 can be reduced. By reducing the mutual coupling between the first radiation conductor 41 and the second feeder line 52, each of the first antenna element 31 and the second antenna element 32 can efficiently radiate electromagnetic waves.

In the antenna 10 according to the present embodiment, the first feeder line 51 is configured to be coupled to the second radiation conductor 42 such that the inductance component serving as the fifth component is dominant. The second coupling portion 75 is configured to couple the second radiation conductor 42 and the first feeder line 51 such that the capacitance component serving as the sixth component different from the fifth component is dominant. A coupling coefficient $K_4$ due to the capacitance component and the inductance component between the second radiation conductor 42 and the first feeder line 51 can be reduced by canceling a coupling coefficient $Ke_4$ and a coupling coefficient $Km_4$ each other. The coupling coefficient $Ke_4$ is a coupling coefficient due to the capacitance component between the second radiation conductor 42 and the first feeder line 51. The coupling coefficient $Km_4$ is a coupling coefficient due to the inductance component between the second radiation conductor 42 and the first feeder line 51.

The coupling coefficient $K_4$ can be determined according to the configuration of the second radiation conductor 42 and the first feeder line 51. In the antenna 10, the magnitude of the coupling coefficient $Ke_4$ can be adjusted by appropriately configuring the second coupling portion 75. In the antenna 10, by the second coupling portion 75 adjusting the magnitude of the coupling coefficient $Ke_4$ according to the coupling coefficient $Km_4$, the degree to which the coupling coefficient $Km_4$ and the coupling coefficient $Ke_4$ cancel each other can be changed. In the antenna 10, by configuring the second coupling portion 75 as appropriate, the coupling coefficient $Km_4$ and the coupling coefficient $Ke_4$ can cancel each other, and the coupling coefficient $K_4$ can be reduced. By reducing the coupling coefficient $K_4$, the mutual coupling between the second radiation conductor 42 and the first feeder line 51 can be reduced. By reducing the mutual coupling between the second radiation conductor 42 and the first feeder line 51, each of the first antenna element 31 and the second antenna element 32 can efficiently radiate electromagnetic waves.

The antenna 10 according to the present embodiment has the first coupler 70 that reduces the mutual coupling between the first feeder line 51 and the second feeder line 52, and the second coupler 73 that reduces the mutual coupling between the first radiation conductor 41 and the second radiation conductor 42. The antenna 10 has the first coupling portion 74 that reduces the mutual coupling between the first radiation conductor 41 and the second feeder line 52, and the second coupling portion 75 that reduces the mutual coupling between the second radiation conductor 42 and the first feeder line 51. The antenna 10 separately reduces the mutual couplings by the first coupler 70, the second coupler 73, the first coupling portion 74, and the second coupling portion 75 which are different couplers. The first coupler 70, the second coupler 73, the first coupling portion 74, and the second coupling portion 75 are independent of each other. By having the first coupler 70, the second coupler 73, the first coupling portion 74, and the second coupling portion 75, the antenna 10 can increase the flexibility in design for reducing the mutual coupling.

Figure 7:
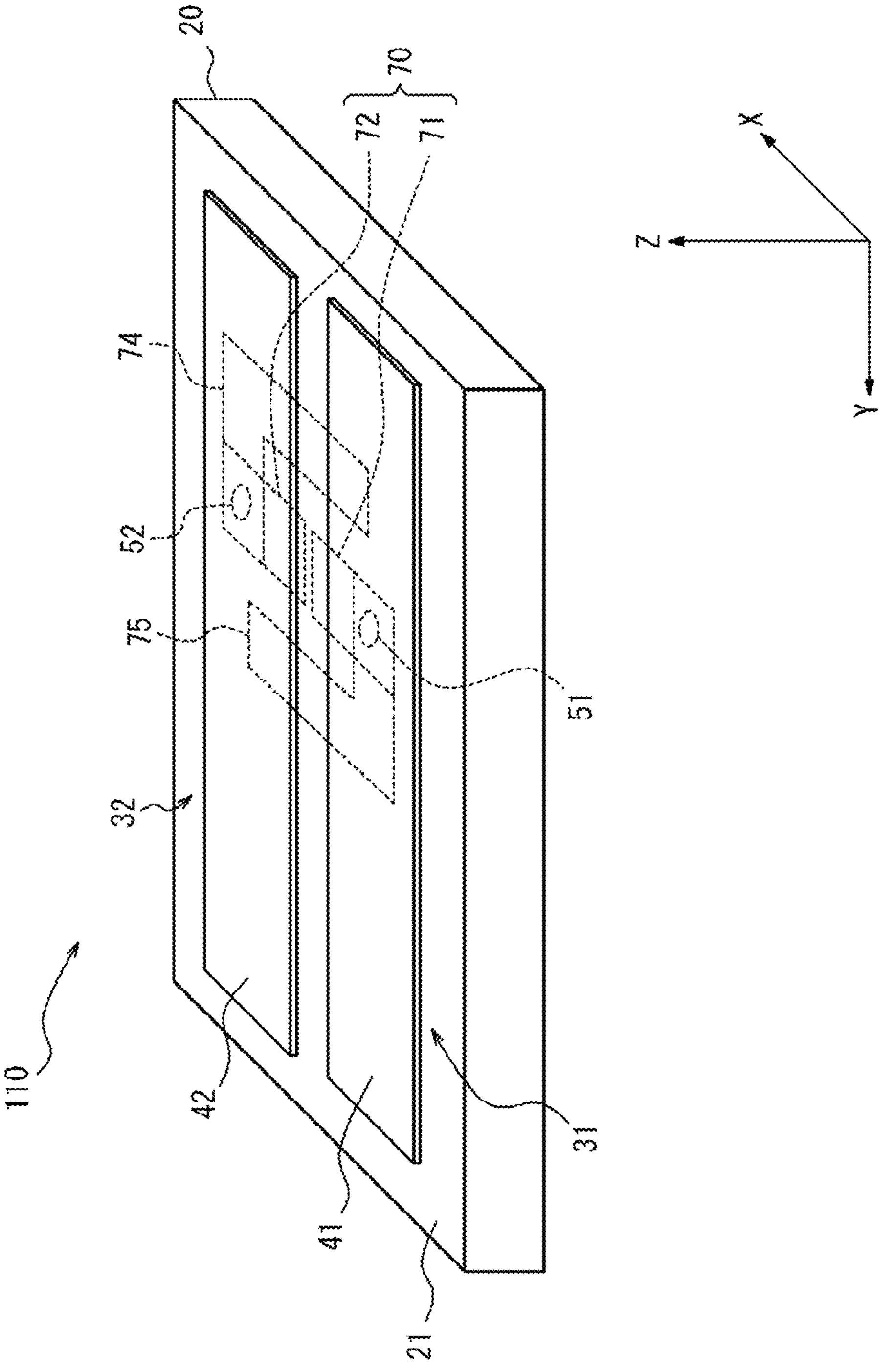
FIG. 7 is a perspective view of an antenna according to an embodiment.

FIG. 7 is a perspective view of an antenna 110 according to an embodiment. Unlike the antenna 10 illustrated in FIG. 1, the antenna 110 does not have the second coupler 73.

In the antenna 110, the second radiation conductor 42 can be configured to be coupled to the first radiation conductor 41 with the first coupling method. In the antenna 110, at least one of the first coupling portion 74 and the second coupling portion 75 may be configured to couple the first radiation conductor 41 and the second radiation conductor 42 with the second coupling method.

For example, when the second radiation conductor 42 is configured to be coupled to the first radiation conductor 41 with the first coupling method in which the magnetic field coupling is dominant, a position of the first coupling portion 74 in the Z direction may be appropriately adjusted. In this case, the first coupling portion 74 whose position in the Z direction is appropriately adjusted may capacitively couple the first radiation conductor 41 and the second radiation conductor 42. Alternatively, the second coupling portion 75 whose position in the Z direction is appropriately adjusted may capacitively couple the first radiation conductor 41 and the second radiation conductor 42.

Other configurations and effects of the antenna 110 are the same as or similar to the configurations and effects of the antenna 10 illustrated in FIG. 1.

Figure 8:
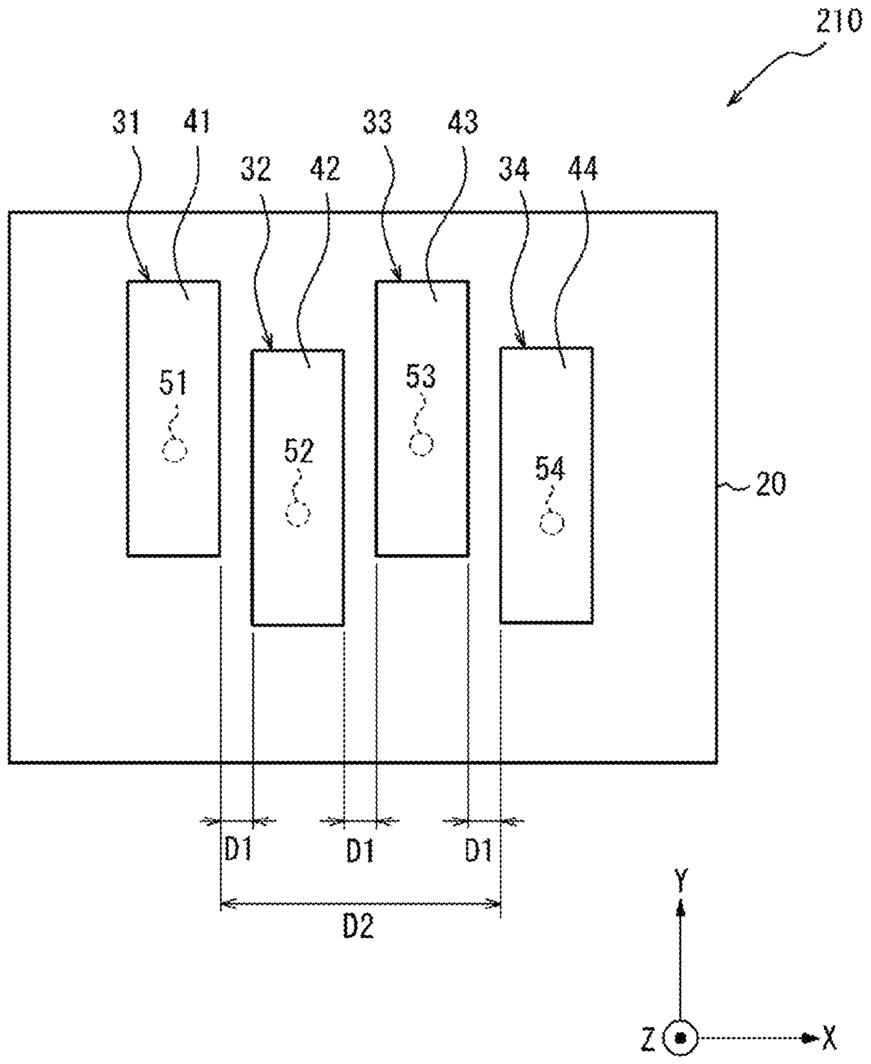
FIG. 8 is a plan view of an antenna according to an embodiment.

FIG. 8 is a plan view of an antenna 210 according to an embodiment. In FIG. 8, a first direction is the X direction. A second direction is the Y direction. However, the first direction and the second direction do not have to be orthogonal to each other. The first direction and the second direction may intersect.

The antenna 210 can be an array antenna. The antenna 210 may be a linear array antenna.

The antenna 210 has the base 20 and n (n: 3 or more integers) antenna elements as a plurality of antenna elements. In the present embodiment, the antenna 210 has four antenna elements (n=4), that is, a first antenna element 31, a second antenna element 32, a third antenna element 33, and a fourth antenna element 34.

The antenna 210 may appropriately have the first coupler 70, the second coupler 73, the first coupling portion 74, and the second coupling portion 75 illustrated in FIG. 1, depending on the configuration of the first antenna element 31 and the like.

The third antenna element 33 is configured to resonate in a first frequency band or a second frequency band depending on the use of the antenna 210 and the like. The third antenna element 33 may have the same or similar configuration as the first antenna element 31 or the second antenna element 32 illustrated in FIG. 1. The third antenna element 33 has a third radiation conductor 43 and a third feeder line 53. The third radiation conductor 43 may have the same or similar configuration as the first radiation conductor 41 or the second radiation conductor 42 illustrated in FIG. 1. The third feeder line 53 may have the same or similar configuration as the first feeder line 51 or the second feeder line illustrated in FIG. 3.

The fourth antenna element 34 is configured to resonate in a first frequency band or a second frequency band depending on the use of the antenna 210 and the like. The fourth antenna element 34 may have the same or similar configuration as the first antenna element 31 or the second antenna element 32 illustrated in FIG. 1. The fourth antenna element 34 has a fourth radiation conductor 44 and a fourth feeder line 54. The fourth radiation conductor 44 may have the same or similar configuration as the first radiation conductor 41 or the second radiation conductor 42 illustrated in FIG. 1. The fourth feeder line 54 may have the same or similar configuration as the first feeder line 51 or the second feeder line illustrated in FIG. 3.

The first antenna element 31 to the fourth antenna element 34 may be configured to resonate in the same phase. The first feeder line 51 to the fourth feeder line 54 may be configured to feed signals that respectively excite the first antenna element 31 to the fourth antenna element 34 in the same phase. When exciting the first antenna element 31 to the fourth antenna element 34 in the same phase, the signals fed from the first feeder line 51 to the fourth feeder line 54 to the first antenna element 31 to the fourth antenna element 34 may have the same phase. When exciting the first antenna element 31 to the fourth antenna element 34 in the same phase, the signals fed from the first feeder line 51 to the fourth feeder line 54 to the first antenna element 31 to the fourth antenna element 34 may have different phases.

The first antenna element 31 to the fourth antenna element 34 may be configured to resonate in different phases. The first feeder line 51 to the fourth feeder line 54 may be configured to feed signals that respectively excite the first antenna element 31 to the fourth antenna element 34 in different phases. When exciting the first antenna element 31 to the fourth antenna element 34 in different phases, the signals fed from the first feeder line 51 to the fourth feeder line 54 to the first antenna element 31 to the fourth antenna element 34 may have the same phase. When exciting the first antenna element 31 to the fourth antenna element 34 in different phases, the signals fed from the first feeder line 51 to the fourth feeder line 54 to the first antenna element 31 to the fourth antenna element 34 may have different phases.

The first antenna element 31, the second antenna element 32, the third antenna element 33, and the fourth antenna element 34 are arranged along the X direction. The first antenna element 31, the second antenna element 32, the third antenna element 33, and the fourth antenna element 34 may be arranged at intervals equal to or less than ¼ of the resonance wavelength of the antenna 210 in the X direction. In the present embodiment, the first radiation conductor 41, the second radiation conductor 42, the third radiation conductor 43, and the fourth radiation conductor 44 are arranged along the X direction with an interval D1. The interval D1 is equal to or less than ¼ of the resonance wavelength of the antenna 210.

When the fourth antenna element 34 serving as an n-th antenna element resonates at the first frequency, the fourth radiation conductor 44 serving as an n-th radiation conductor may be arranged with the first radiation conductor 41 in the X direction at an interval equal to or less than ½ of the resonance wavelength of the antenna 210. In the present embodiment, the first radiation conductor 41 and the fourth radiation conductor 44 are arranged along the X direction with an interval D2. The interval D2 is equal to or less than ½ of the resonance wavelength of the antenna 210. The fourth radiation conductor 44 may be configured to be directly or indirectly coupled to the second radiation conductor 42.

The first antenna element 31 and the second antenna element 32 that are adjacent to each other may be shift in the Y direction. When the first antenna element 31 and the second antenna element 32 that are adjacent to each other are shift in the Y direction, the antenna 210 may have the first coupler 70 illustrated in FIG. 1, which is appropriately adjusted according to the shift. In the same or similar manner, the second antenna element 32 and the third antenna element 33 that are adjacent to each other, and the third antenna element 33 and the fourth antenna element 34 that are adjacent to each other may be shift in the Y direction. The antenna 210 may have the first coupler 70 that is appropriately adjusted according to the amount of shift between them.

Figure 9:
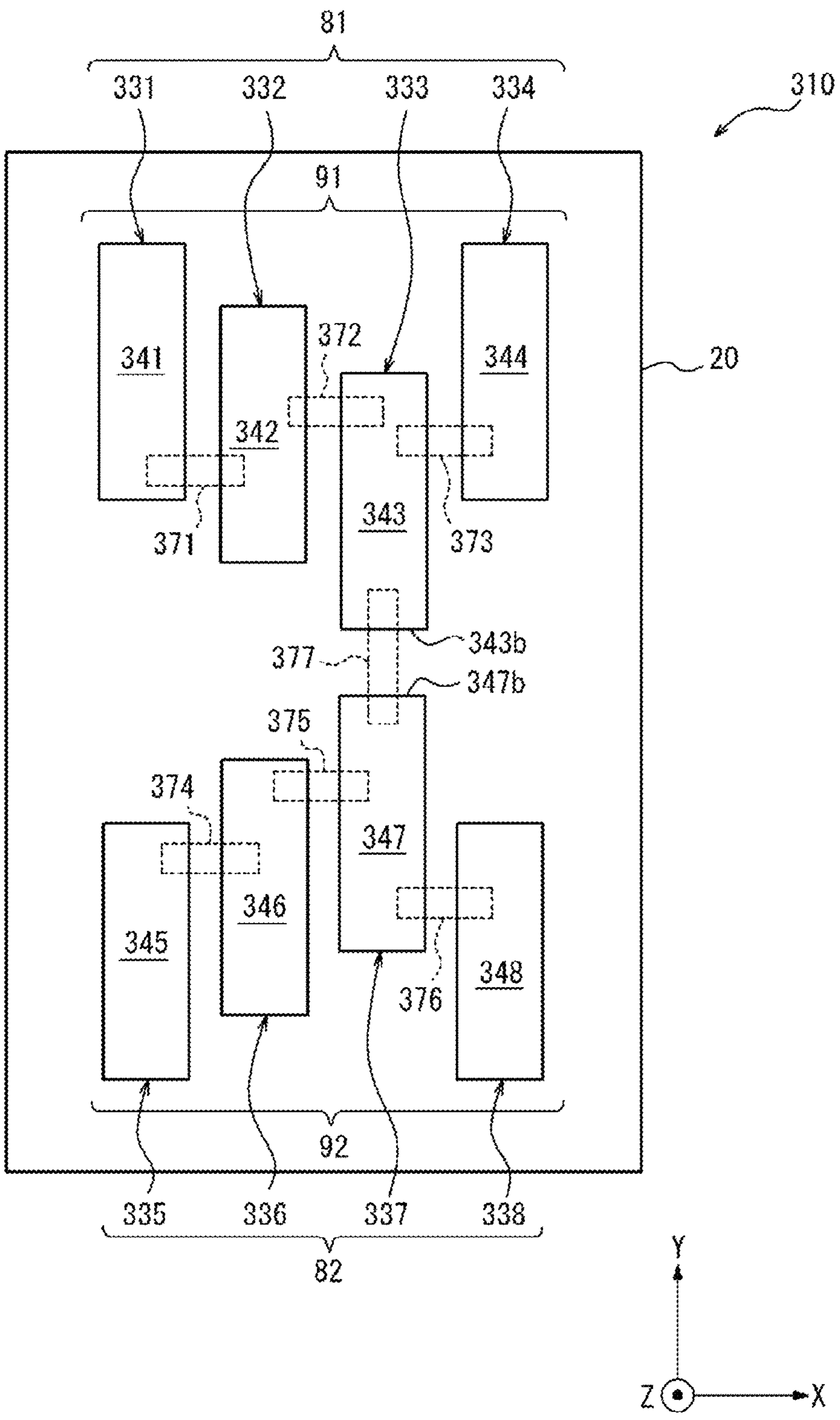
FIG. 9 is a plan view of an antenna according to an embodiment.

FIG. 9 is a plan view of an antenna 310 according to an embodiment. In FIG. 9, a first direction is the X direction. A second direction is the Y direction.

The antenna 310 can be an array antenna. The antenna 310 may be a planar antenna.

The antenna 310 has the base 20, a first antenna element group 81, and a second antenna element group 82. The antenna 310 may further include second couplers 371, 372, 373, 374, 375, 376, and 377. The antenna 310 may appropriately have the first coupler 70, the first coupling portion 74, and the second coupling portion 75 illustrated in FIG. 1, depending on the configuration of the first antenna element group 81 and the like.

Each of the first antenna element group 81 and the second antenna element group 82 extends along the X direction. The first antenna element group 81 and the second antenna element group 82 are arranged along the Y direction. Each of the first antenna element group 81 and the second antenna element group 82 may have the same or similar configuration as an antenna element group illustrated in FIG. 8. The antenna element group illustrated in FIG. 8 includes the first antenna element 31, the second antenna element 32, the third antenna element 33, and the fourth antenna element 34.

The first antenna element group 81 includes antenna elements 331, 332, 333, and 334. Each of the antenna elements 331 to 343 may have the same or similar configuration as the first antenna element 31 or the second antenna element 32 illustrated in FIG. 1. The antenna elements 331, 332, 333, and 334 include radiation conductors 341, 342, 343, and 344, respectively. Each of the radiation conductors 341 to 344 may have the same or similar configuration as the first radiation conductor 41 or the second radiation conductor 42 illustrated in FIG. 1.

The second antenna element group 82 includes antenna elements 335, 336, 337, and 338. Each of the antenna elements 335 to 338 may have the same or similar configuration as the first antenna element 31 or the second antenna element 32 illustrated in FIG. 1. The antenna elements 335, 336, 337, and 338 include radiation conductors 345, 346, 347, and 348, respectively. Each of the radiation conductors 345 to 348 may have the same or similar configuration as the first radiation conductor 41 or the second radiation conductor 42 illustrated in FIG. 1.

The antenna elements 331 to 338 may be configured to resonate in the same phase. Feeder lines of the antenna elements 331 to 338 may be configured to feed signals that excite the antenna elements 331 to 338 in the same phase. When the antenna elements 331 to 338 are excited in the same phase, the signals fed from the feeder lines of the antenna elements 331 to 338 to the antenna elements 331 to 338 may have the same phase. When the antenna elements 331 to 338 are excited in the same phase, the signals fed from the feeder lines of the antenna elements 331 to 338 to the antenna elements 331 to 338 may have different phases.

The antenna elements 331 to 338 may be configured to resonate in different phases. The feeder lines of the antenna elements 331 to 338 may be configured to feed the signals that excite the antenna elements 331 to 338 in different phases. When the antenna elements 331 to 338 are excited in different phases, the signals fed from the feeder lines of the antenna elements 331 to 338 to the antenna elements 331 to 338 may have the same phase. When the antenna elements 331 to 338 are excited in different phases, the signals fed from the feeder lines of the antenna elements 331 to 338 to the antenna elements 331 to 338 may have different phases.

In the first antenna element group 81, the antenna elements 331 to 334 are arranged along the X direction. The antenna elements 331 to 334 may be arranged to be shifted in the Y direction. Of the antenna elements 331 to 334, the antenna element 333 protrudes toward the second antenna element group 82.

In the second antenna element group 82, the antenna elements 335 to 338 are arranged along the X direction. The antenna elements 335 to 338 may be arranged to be shifted in the Y direction. Of the antenna elements 335 to 338, the antenna element 337 protrudes toward the first antenna element group 81.

At least one antenna element of the first antenna element group 81 is configured to be capacitively coupled or magnetically coupled to at least one antenna element of the second antenna element group 82. In the present embodiment, the radiation conductor 343 of the antenna element 333 of the first antenna element group 81 is configured to be capacitively coupled to the radiation conductor 347 of the antenna element 337 of the second antenna element group 82. For example, a short side 343*b* of the radiation conductor 343 and a short side 347*b* of the radiation conductor 347 face each other. The short side 343*b* and the short side 347*b* facing each other can configure a capacitor via the base 20. By configuring the capacitor, the radiation conductor 343 of the antenna element 333 is configured to be capacitively coupled to the radiation conductor 347 of the antenna element 337.

The first antenna element group 81 includes the radiation conductors 341, 342, 343, and 344 as a first radiation conductor group 91. The second antenna element group 82 includes the radiation conductors 345, 346, 347, and 348 as a second radiation conductor group 92.

In the first radiation conductor group 91, the radiation conductor 341 and the radiation conductor 342 that are adjacent to each other are configured to be coupled with a third coupling method in which one of the capacitive coupling and the magnetic field coupling is dominant. The coupling between the radiation conductor 341 and the radiation conductor 342 is a coupling in which the magnetic field coupling among the magnetic field coupling and the electric field coupling is dominant, in the same as or similar to the first radiation conductor 41 and the second radiation conductor 42 illustrated in FIG. 1. The radiation conductor 341 and the radiation conductor 342 that are adjacent to each other are configured to be coupled with a third coupling method in which the magnetic field coupling is dominant. In the same or similar manner, the radiation conductor 342 and the radiation conductor 343 that are adjacent to each other are configured to be coupled with the third coupling method in which the magnetic field coupling is dominant. In the same or similar manner, the radiation conductor 343 and the radiation conductor 344 that are adjacent to each other are configured to be coupled with the third coupling method in which the magnetic field coupling is dominant.

In the second radiation conductor group 92, the radiation conductor 345 and the radiation conductor 346 that are adjacent to each other are configured to be coupled with the third coupling method in which the magnetic field coupling is dominant, in the same as or similar to the radiation conductor 341 and the radiation conductor 342. In the same or similar manner, the radiation conductor 346 and the radiation conductor 347 that are adjacent to each other are configured to be coupled with the third coupling method in which the magnetic field coupling is dominant. In the same or similar manner, the radiation conductor 347 and the radiation conductor 348 that are adjacent to each other are configured to be coupled with the third coupling method in which the magnetic field coupling is dominant.

The second coupler 371 is configured to couple the radiation conductor 341 and the radiation conductor 342 that are adjacent to each other with a fourth coupling method different from the third coupling method. In the present embodiment, since the third coupling method is a coupling method in which the magnetic field coupling is dominant, the fourth coupling method is a coupling method in which the capacitive coupling is dominant. The second coupler 371 is configured to couple the radiation conductor 341 and the radiation conductor 342 that are adjacent to each other with the fourth coupling method in which the capacitive coupling is dominant, in the same as or similar to the second coupler 73 illustrated in FIG. 1. By the second coupler 371 coupling the radiation conductor 341 and the radiation conductor 342 that are adjacent to each other with the fourth coupling method, the mutual coupling between the radiation conductor 341 and the radiation conductor 342 that are adjacent to each other can be reduced.

In the same as or similar to the second coupler 371, the second coupler 372 is configured to couple the radiation conductor 342 and the radiation conductor 343 that are adjacent to each other with the fourth coupling method in which the capacitive coupling is dominant. The second coupler 373 is configured to couple the radiation conductor 343 and the radiation conductor 344 that are adjacent to each other with the fourth coupling method in which the capacitive coupling is dominant. The second coupler 374 is configured to couple the radiation conductor 345 and the radiation conductor 346 that are adjacent to each other with the fourth coupling method in which the capacitive coupling is dominant. The second coupler 375 is configured to couple the radiation conductor 346 and the radiation conductor 347 that are adjacent to each other with the fourth coupling method in which the capacitive coupling is dominant. The second coupler 376 is configured to couple the radiation conductor 347 and the radiation conductor 348 that are adjacent to each other with the fourth coupling method in which the capacitive coupling is dominant. Such a configuration can reduce the mutual coupling between adjacent radiation conductors.

The second coupler 377 is configured to magnetically couple the radiation conductor 343 of the first radiation conductor group 91 and the radiation conductor 347 of the second radiation conductor group 92. The second coupler 377 may include a coil or the like. By magnetically coupling the radiation conductor 343 and the radiation conductor 347 by the second coupler 377, the mutual coupling between the radiation conductor 343 and the radiation conductor 347 can be reduced.

Figure 10:
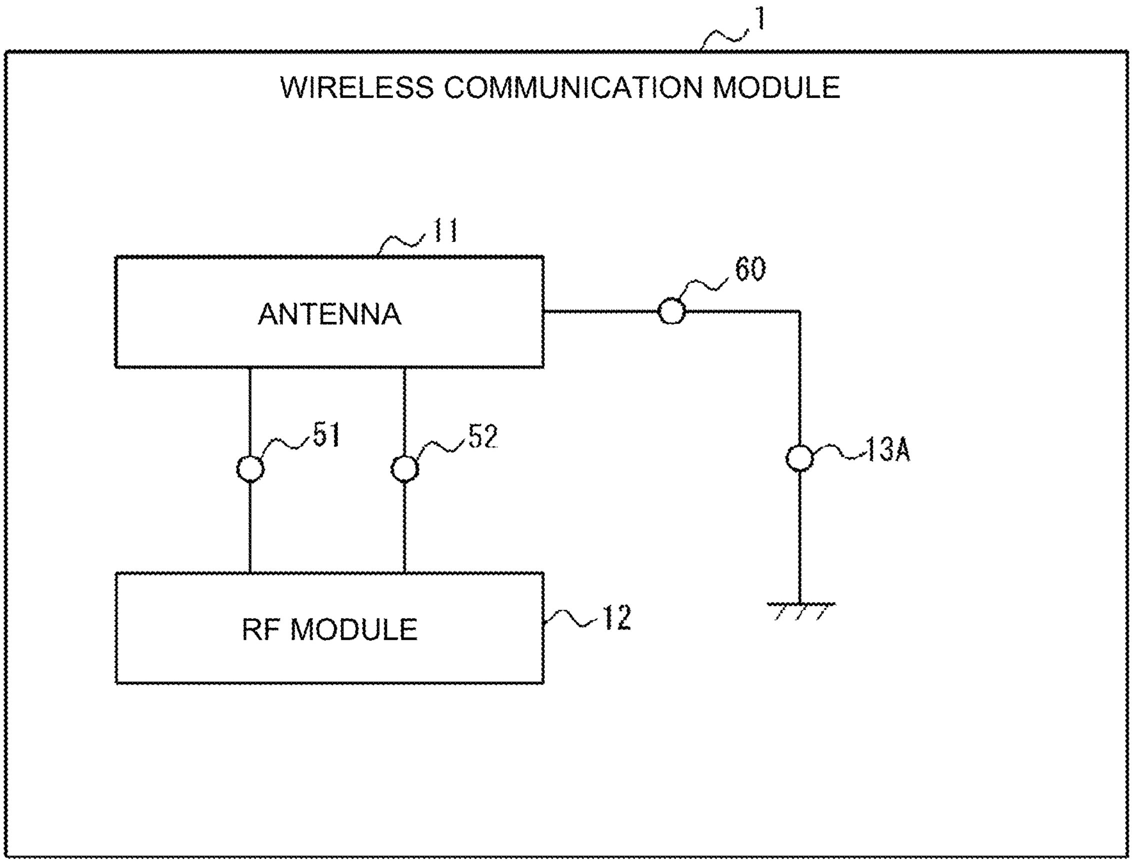
FIG. 10 is a block diagram of a wireless communication module according to an embodiment.
Figure 11:
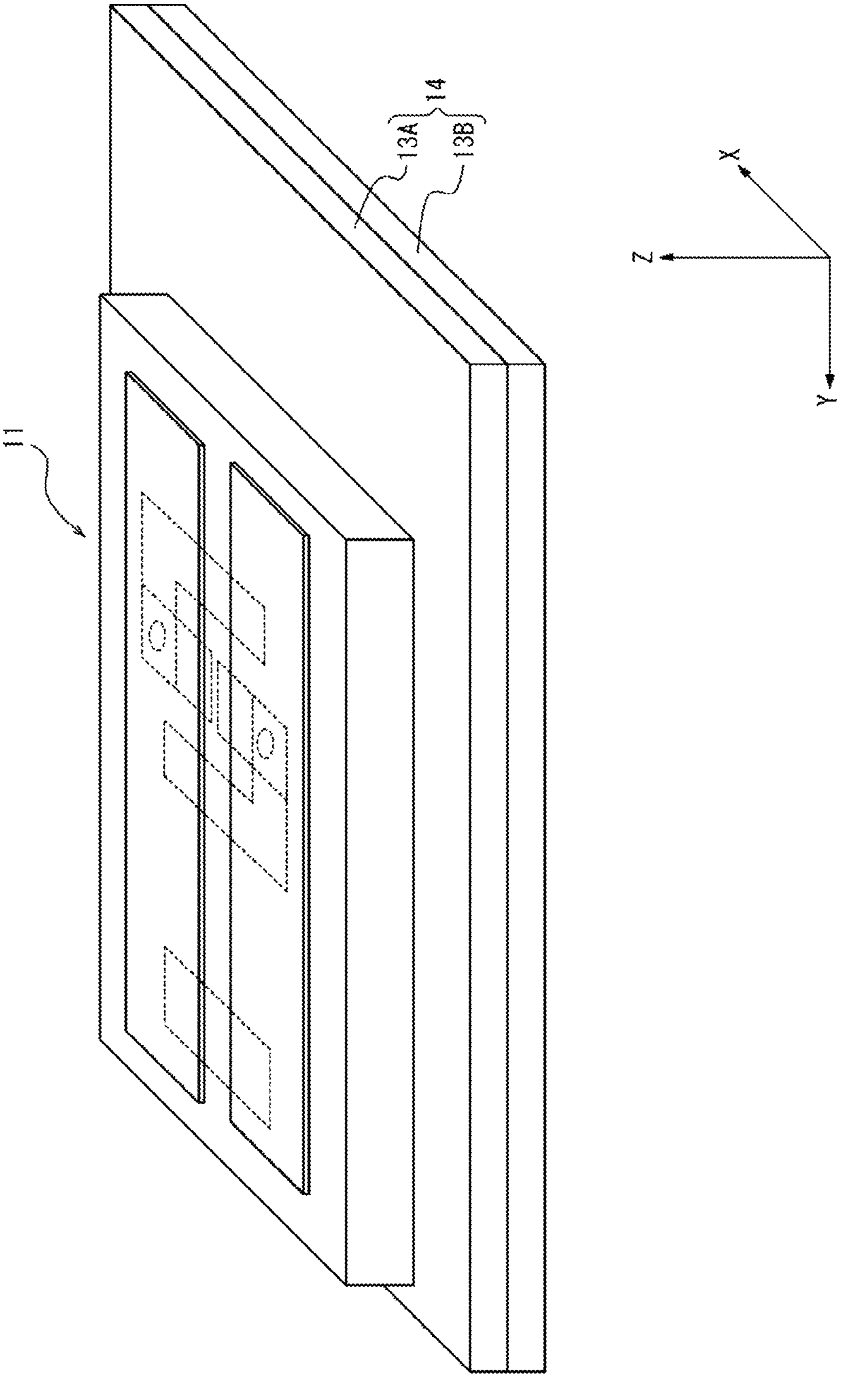
FIG. 11 is a schematic configuration view of the wireless communication module illustrated in FIG. 10.

FIG. 10 is a block diagram of a wireless communication module 1 according to an embodiment. FIG. 11 is a schematic configuration view of the wireless communication module 1 illustrated in FIG. 10.

The wireless communication module 1 includes an antenna 11, an RF module 12, and a circuit board 14. The circuit board 14 has a ground conductor 13A and a printed circuit board 13B.

The antenna 11 includes the antenna 10 illustrated in FIG. 1. However, the antenna 11 may include any of the antenna 110 illustrated in FIG. 7, the antenna 210 illustrated in FIG. 8, and the antenna 310 illustrated in FIG. 9 instead of the antenna 10 illustrated in FIG. 1. The antenna 11 has the first feeder line 51 and the second feeder line 52. The antenna 11 has a ground conductor 60. The ground conductor 60 is configured by integrating the first ground conductor 61 and the second ground conductor 62 illustrated in FIG. 2.

The antenna 11 is located on the circuit board 14 as illustrated in FIG. 11. The first feeder line 51 of the antenna 11 is configured to be connected to the RF module 12 illustrated in FIG. 10 via the circuit board 14 illustrated in FIG. 11. The second feeder line 52 of the antenna 11 is configured to be connected to the RF module 12 illustrated in FIG. 10 via the circuit board 14 illustrated in FIG. 11. The ground conductor 60 of the antenna 11 is configured to be electromagnetically connected to the ground conductor 13A included in the circuit board 14.

The antenna 11 is not limited to the one having both the first feeder line 51 and the second feeder line 52. The antenna 11 may have one feeder line of the first feeder line 51 and the second feeder line 52. When the antenna 11 has one feeder line of the first feeder line 51 and the second feeder line 52, the configuration of the circuit board 14 can be appropriately changed according to the configuration of the antenna 11 having one feeder line. For example, the RF module 12 may have only one connection terminal. For example, the circuit board 14 may have one conductive wire configured to connect the connection terminal of the RF module 12 and the feeder line of the antenna 11.

The ground conductor 13A may include a conductive material. The ground conductor 13A can extend in the XY plane.

The antenna 11 may be integrated with the circuit board 14. In the configuration in which the antenna 11 and the circuit board 14 are integrated, the ground conductor 60 of the antenna 11 may be integrated with the ground conductor 13A of the circuit board 14.

The RF module 12 is configured to control power fed to the antenna 11. The RF module 12 is configured to modulate a baseband signal and supply the modulated baseband signal to the antenna 11. The RF module 12 is configured to modulate an electrical signal received by the antenna 11 into the baseband signal.

The wireless communication module 1 can efficiently radiate electromagnetic waves by including the antenna 11.

Figure 12:
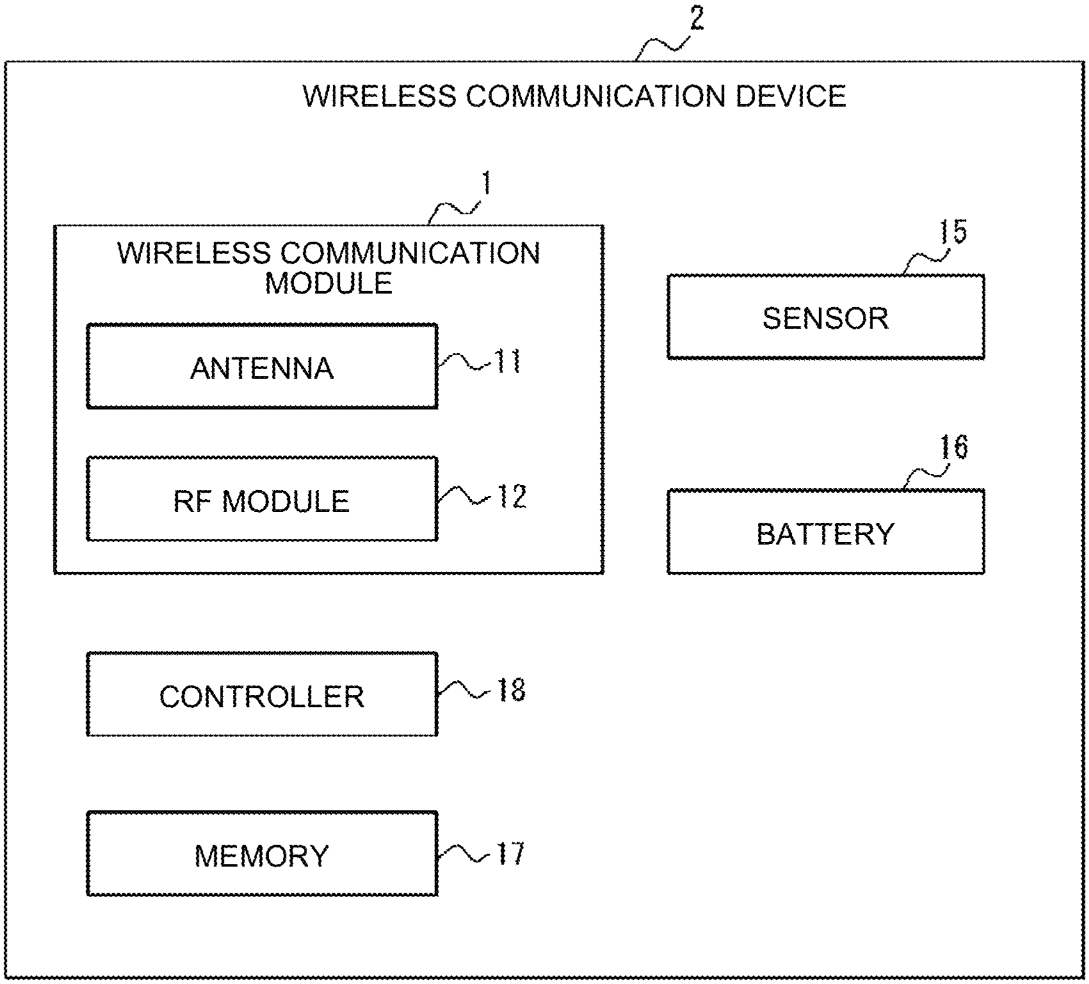
FIG. 12 is a block diagram of a wireless communication device according to an embodiment.
Figure 13:
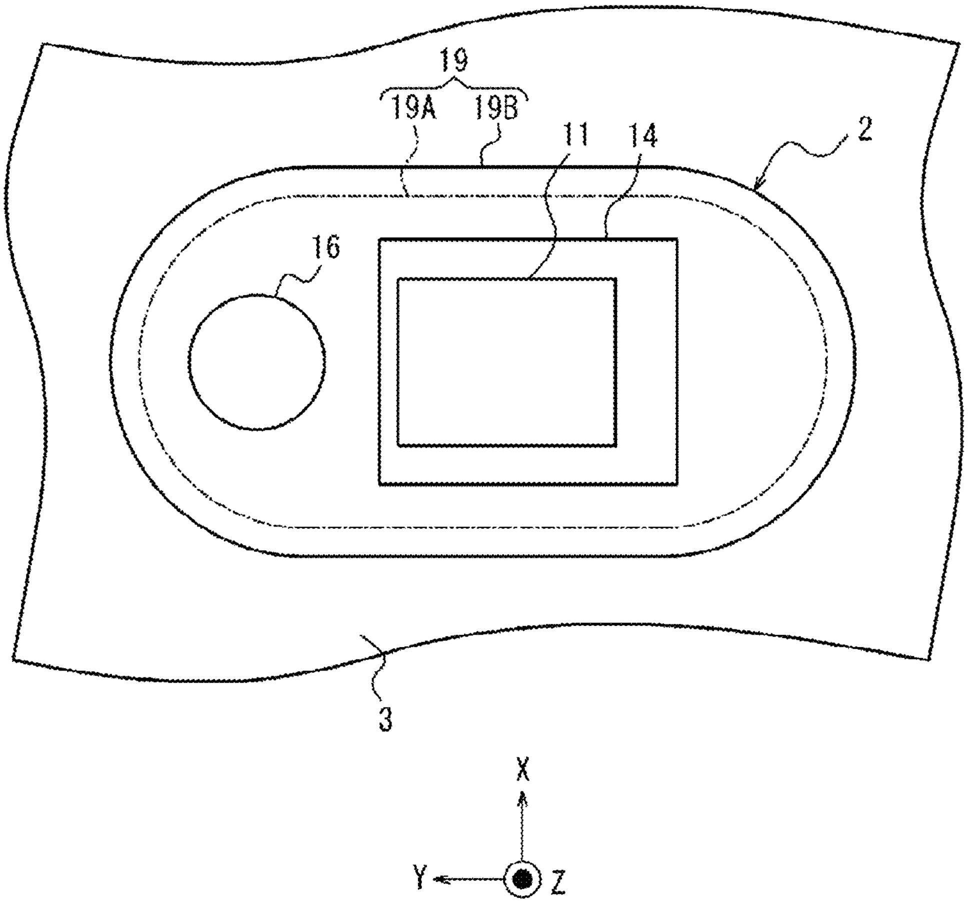
FIG. 13 is a plan view of the wireless communication device illustrated in FIG. 12.
Figure 14:
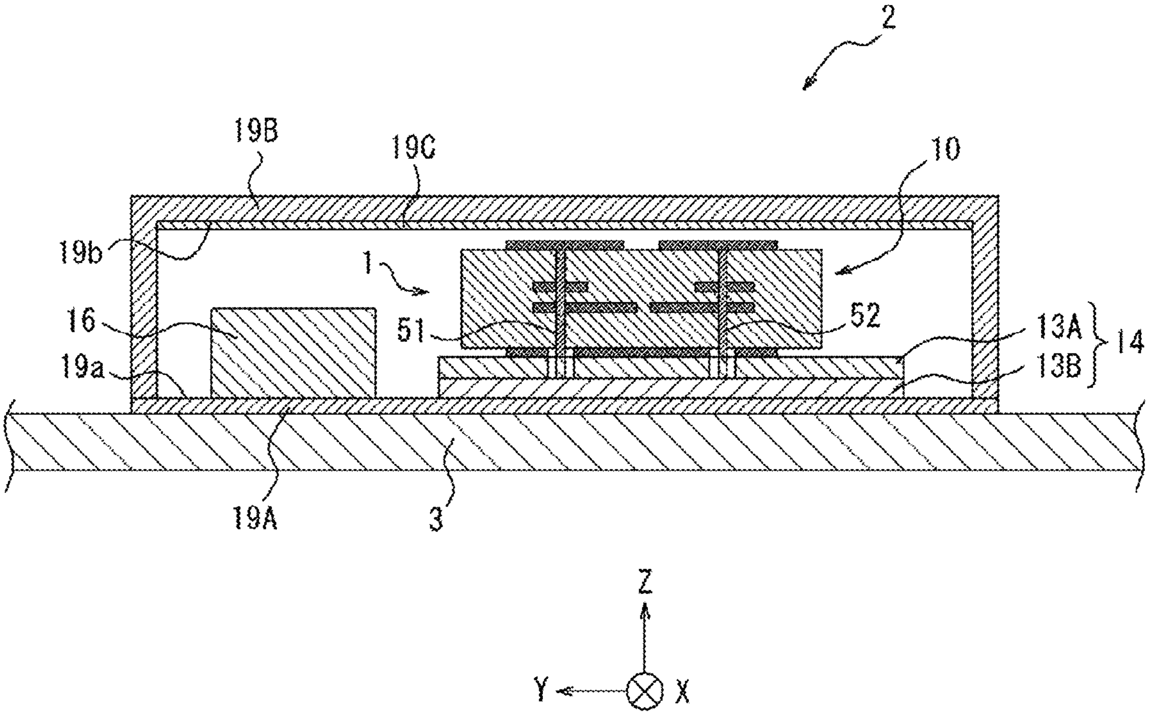
FIG. 14 is a cross-sectional view of the wireless communication device illustrated in FIG. 12.

FIG. 12 is a block diagram of a wireless communication device 2 according to an embodiment. FIG. 13 is a plan view of the wireless communication device 2 illustrated in FIG. 12. FIG. 14 is a cross-sectional view of the wireless communication device 2 illustrated in FIG. 12.

The wireless communication device 2 can be located on a board 3. A material of the board 3 may be any material. As illustrated in FIG. 12, the wireless communication device 2 includes the wireless communication module 1, a sensor 15, a battery 16, a memory 17, and a controller 18. As illustrated in FIG. 13, the wireless communication device 2 includes a housing 19.

The sensor 15 may include, for example, a speed sensor, a vibration sensor, an acceleration sensor, a gyro sensor, a rotation angle sensor, an angular velocity sensor, a geomagnetic sensor, a magnet sensor, a temperature sensor, a humidity sensor, an atmospheric pressure sensor, an optical sensor, an illuminance sensor, a UV sensor, a gas sensor, a gas concentration sensor, an atmosphere sensor, a level sensor, an odor sensor, a pressure sensor, an air pressure sensor, a contact sensor, a wind power sensor, an infrared sensor, a human sensor, a displacement sensor, an image sensor, a weight sensor, a smoke sensor, a liquid leakage sensor, a vital sensor, a battery remaining amount sensor, an ultrasonic sensor, or a global positioning system (GPS) signal receiving device, or the like.

The battery 16 is configured to supply power to the wireless communication module 1. The battery 16 may be configured to supply the power to at least one of the sensor 15, the memory 17, and the controller 18. The battery 16 may include at least one of a primary battery and a secondary battery. A negative electrode of the battery 16 is configured to be electrically connected to the ground terminal of the circuit board 14 illustrated in FIG. 11. The negative electrode of the battery 16 is configured to be electrically connected to a ground conductor 60 of the antenna 11.

The memory 17 can include, for example, a semiconductor memory or the like. The memory 17 may be configured to function as a work memory of the controller 18. The memory 17 can be included in the controller 18. The memory 17 stores a program that describes processing contents for implementing each function of the wireless communication device 2, information used for processing in the wireless communication device 2, and the like.

The controller 18 can include, for example, a processor. The controller 18 may include one or more processors. The processor may include a general-purpose processor that loads a specific program and executes a specific function, and a dedicated processor that is specialized for specific processing. The dedicated processor may include an application specific IC. The application specific IC is also called an application specific integrated circuit (ASIC). The processor may include a programmable logic device. The programmable logic device is also called a programmable logic device (PLD). The PLD may include a field-programmable gate array (FPGA). The controller 18 may be either a system-on-a-chip (SoC) in which one or a plurality of processors cooperate, and a system in a package (SiP). The controller 18 may store various kinds of information, a program for operating each component of the wireless communication device 2, or the like in the memory 17.

The controller 18 is configured to generate a transmission signal transmitted from the wireless communication device 2. The controller 18 may be configured to acquire measurement data from, for example, the sensor 15. The controller 18 may be configured to generate a transmission signal according to the measurement data. The controller 18 can be configured to transmit a baseband signal to the RF module 12 of the wireless communication module 1.

The housing 19 illustrated in FIG. 13 is configured to protect other devices of the wireless communication device 2. The housing 19 may include a first housing 19A and a second housing 19B.

The first housing 19A illustrated in FIG. 14 can extend in the XY plane. The first housing 19A is configured to support other devices. The first housing 19A may be configured to support the wireless communication device 2. The wireless communication device 2 is located on an upper surface 19*a* of the first housing 19A. The first housing 19A may be configured to support the battery 16. The battery 16 is located on the upper surface 19*a* of the first housing 19A. The wireless communication module 1 and the battery 16 may be arranged along the X direction on the upper surface 19*a* of the first housing 19A.

The second housing 19B illustrated in FIG. 14 may be configured to cover other devices. The second housing 19B includes a lower surface 19*b* located on the negative direction side of the Z axis of the antenna 11. The lower surface 19*b* extends along the XY plane. The lower surface 19*b* is not limited to being flat and can include irregularities. The second housing 19B may have a conductor member 19C. The conductor member 19C is located on at least one of the interior, the outside, and the inside of the second housing 19B. The conductor member 19C is located on at least one of the upper surface and the side surface of the second housing 19B.

The conductor member 19C illustrated in FIG. 14 faces the antenna 11. The antenna 11 can be coupled to the conductor member 19C to radiate the electromagnetic waves by using the conductor member 19C as a secondary radiator. When the antenna 11 and the conductor member 19C face each other, the capacitive coupling between the antenna 11 and the conductor member 19C can be increased. When a current direction of the antenna 11 is along the extending direction of the conductor member 19C, the electromagnetic coupling between the antenna 11 and the conductor member 19C can be increased. This coupling can be a mutual inductance.

The configuration according to the present disclosure is not limited to the embodiments described above, and various modifications or changes can be made. For example, the functions and the like included in each component can be rearranged so as not to logically contradict each other, and a plurality of components can be combined into one or divided.

For example, in the above-described embodiments as illustrated in FIG. 1, the second coupler 73 is described as being located on the negative direction side of the Z axis as compared to the first radiation conductor 41 and the second radiation conductor 42. However, the second coupler 73 does not have to be located on the negative direction side of the Z axis if it is configured to couple the first radiation conductor 41 and the second radiation conductor 42 with the second coupling method. For example, the second coupler 73 may be located on the positive direction side of the Z axis as compared to the first radiation conductor 41 and the second radiation conductor 42.

The diagrams illustrating the configuration according to the present disclosure are schematic. The dimensional ratios and the like on the drawings do not always match the actual ones.

In the present disclosure, the terms "first", "second", "third" and so on are examples of identifiers meant to distinguish the configurations from each other. In the present disclosure, regarding the configurations distinguished by the terms "first" and "second", the respective identifying numbers can be reciprocally exchanged. For example, regarding a first frequency and a second frequency, the identifiers "first" and "second" can be reciprocally exchanged. The exchange of identifiers is performed simultaneously. Even after exchanging the identifiers, the configurations remain distinguished from each other. Identifiers may be removed. The configurations from which the identifiers are removed are still distinguishable by the reference numerals. In the present disclosure, the terms "first", "second", and so on of the identifiers should not be used in the interpretation of the order of the configurations, or should not be used as the basis for having identifiers with low numbers, or should not be used as the basis for having identifies with high numbers.

The invention claimed is:

1. An antenna comprising:

a first antenna element that includes a first radiation conductor and a first feeder line and is configured to resonate in a first frequency band;

a second antenna element that includes a second radiation conductor and a second feeder line and is configured to resonate in a second frequency band;

a first coupler; and a first coupling portion, wherein the second feeder line is configured to be coupled to the first feeder line by a first coupling in which a first component is dominant, the first component being a capacitance component or an inductance component, the first coupler is configured to couple the first feeder line and the second feeder line by a second coupling in which a second component different from the first component is dominant, the second component being the inductance component or the capacitance component, the first radiation conductor and the second radiation conductor are arranged at an interval equal to or less than ½ of a resonance wavelength of the antenna, the second feeder line is configured to be coupled to the first radiation conductor by a third coupling in which a third component is dominant, the third component being the capacitance component or the inductance component, and the first coupling portion is configured to couple the first radiation conductor and the second feeder line by a fourth coupling in which a fourth component different from the third component is dominant, the fourth component being the inductance component or the capacitance component.

2. The antenna according to claim 1, further comprising:

a second coupling portion, wherein the first feeder line is configured to be coupled to the second radiation conductor by a fifth coupling in which a fifth component is dominant, the fifth component being the capacitance component or the inductance component, and the second coupling portion is configured to couple the second radiation conductor and the first feeder line by a sixth coupling in which a sixth component different from the fifth component is dominant, the sixth component being the inductance component or the capacitance component.

3. The antenna according to claim 1, further comprising:

a second coupler, wherein the second radiation conductor is configured to be coupled to the first radiation conductor with a first coupling method in which one of a capacitive coupling and a magnetic field coupling is dominant, and the second coupler is configured to couple the first radiation conductor and the second radiation conductor with a second coupling method in which the other of the capacitive coupling and the magnetic field coupling is dominant.

4. The antenna according to claim 1, wherein the first frequency band and the second frequency band belong to a same frequency band.

5. The antenna according to claim 1, wherein the first frequency band and the second frequency band belong to different frequency bands.

6. The antenna according to claim 1, wherein the first antenna element further includes a first ground conductor.

7. The antenna according to claim 6, wherein the second antenna element further includes a second ground conductor.

8. The antenna according to claim 7, wherein the first ground conductor is connected to the second ground conductor.

9. The antenna according to claim 7, wherein the first ground conductor and the second ground conductor are formed integrally, and the first ground conductor and the second ground conductor are integrated with a single base.

10. The antenna according to claim 1, further comprising:

a plurality of antenna elements including the first antenna element and the second antenna element, wherein the plurality of antenna elements is arranged along a first direction, and adjacent antenna elements included in the plurality of antenna elements are shift in a second direction different from the first direction.

11. The antenna according to claim 10, wherein the plurality of antenna elements is arranged in the first direction at intervals equal to or less than ¼ of the resonance wavelength.

12. The antenna according to claim 10, wherein the plurality of antenna elements include an n-th antenna element that includes an n-th radiation conductor and an n-th feeder line, and the n-th antenna element is configured to resonate in the first frequency band, n being an integer of 3 or more, and the n-th radiation conductor is arranged with the first radiation conductor in the first direction at an interval equal to or less than ½ of the resonance wavelength.

13. The antenna according to claim 12, wherein the n-th radiation conductor is configured to be directly or indirectly coupled to the second radiation conductor.

14. The antenna according to claim 10, wherein the plurality of antenna elements includes a first antenna element group arranged in the first direction, and a second antenna element group arranged in the first direction, and at least one antenna element of the first antenna element group is configured to be capacitively coupled or magnetically coupled to at least one antenna element of the second antenna element group.

15. The antenna according to claim 14, wherein the first antenna element group includes a first radiation conductor group, the second antenna element group includes a second radiation conductor group, adjacent radiation conductors included in the first radiation conductor group are configured to be coupled with a third coupling method in which one of a capacitive coupling and a magnetic field coupling is dominant, and the second coupler of the antenna is configured to couple the adjacent radiation conductors included in the first radiation conductor group with a fourth coupling method in which the other of the capacitive coupling and the magnetic field coupling is dominant, and magnetically couple a radiation conductor included in the first radiation conductor group and a radiation conductor included in the second radiation conductor group.

16. The antenna according to claim 15, wherein the adjacent radiation conductors included in the second radiation conductor group are configured to be coupled with the third coupling method, and the second coupler of the antenna is configured to couple the adjacent radiation conductors included in the second radiation conductor with the fourth coupling method.

17. The antenna according to claim 10, wherein the antenna is configured to feed signals for exciting the plurality of antenna elements in a same phase to each of the plurality of antenna elements.

18. The antenna according to claim 10, wherein the antenna is configured to feed signals for exciting the plurality of antenna elements in different phases to the plurality of antenna elements.

19. A wireless communication module comprising:

an antenna including:

a first antenna element that includes a first radiation conductor and a first feeder line and is configured to resonate in a first frequency band, a second antenna element that includes a second radiation conductor and a second feeder line and is configured to resonate in a second frequency band, a first coupler, and a first coupling portion; and an RF module configured to be electrically connected to at least one of the first feeder line and the second feeder line, wherein the second feeder line is configured to be coupled to the first feeder line by a first coupling in which a first component is dominant, the first component being a capacitance component or an inductance component, the first coupler is configured to couple the first feeder line and the second feeder line by a second coupling in which a second component different from the first component is dominant, the second component being the inductance component or the capacitance component, the first radiation conductor and the second radiation conductor are arranged at an interval equal to or less than ½ of a resonance wavelength of the antenna, the second feeder line is configured to be coupled to the first radiation conductor by a third coupling in which a third component is dominant, the third component being the capacitance component or the inductance component, and the first coupling portion is configured to couple the first radiation conductor and the second feeder line by a fourth coupling in which a fourth component different from the third component is dominant, the fourth component being the inductance component or the capacitance component.

20. A wireless communication device comprising:

a wireless communication module comprising:

an antenna including:

a first antenna element that includes a first radiation conductor and a first feeder line and is configured to resonate in a first frequency band, a second antenna element that includes a second radiation conductor and a second feeder line and is configured to resonate in a second frequency band, a first coupler, and a first coupling portion; and an RF module configured to be electrically connected to at least one of the first feeder line and the second feeder line; and a battery configured to supply power to the wireless communication module, wherein the second feeder line is configured to be coupled to the first feeder line by a first coupling in which a first component is dominant, the first component being a capacitance component or an inductance component, the first coupler is configured to couple the first feeder line and the second feeder line by a second coupling in which a second component different from the first component is dominant, the second component being the inductance component or the capacitance component, the first radiation conductor and the second radiation conductor are arranged at an interval equal to or less than ½ of a resonance wavelength of the antenna, the second feeder line is configured to be coupled to the first radiation conductor by a third coupling in which a third component is dominant, the third component being the capacitance component or the inductance component, and the first coupling portion is configured to couple the first radiation conductor and the second feeder line by a fourth coupling in which a fourth component different from the third component is dominant, the fourth component being the inductance component or the capacitance component.

* * * * *